(12) United States Patent
Wakashiro

(10) Patent No.: US 6,901,161 B1
(45) Date of Patent: May 31, 2005

(54) IMAGE-PROCESSING COMPUTER SYSTEM FOR PHOTOGRAMMETRIC ANALYTICAL MEASUREMENT

(75) Inventor: Shigeru Wakashiro, Tokyo (JP)

(73) Assignee: PENTAX Corporation, Tokyo (JP)

( * ) Notice: Subject to any disclaimer, the term of this patent is extended or adjusted under 35 U.S.C. 154(b) by 542 days.

(21) Appl. No.: 09/655,881

(22) Filed: Sep. 6, 2000

(30) Foreign Application Priority Data

Sep. 6, 1999 (JP) .......................... 11-251952

(51) Int. Cl.[7] .......................... G06K 9/00; G06K 9/62; G06K 9/36; H04N 15/00
(52) U.S. Cl. .................. 382/154; 382/291; 382/209; 348/50
(58) Field of Search .................. 382/154, 103, 382/106, 285, 286, 209, 151, 287, 291, 293, 295; 348/42, 47, 48, 50, 135–147; 356/3, 3.01; 702/42, 150–152, 159; 396/89

(56) References Cited

U.S. PATENT DOCUMENTS

| | | | | |
|---|---|---|---|---|
| 5,631,697 A | * | 5/1997 | Nishimura et al. | 348/172 |
| 5,757,674 A | * | 5/1998 | Marugame | 702/152 |
| 5,832,106 A | * | 11/1998 | Kim | 382/154 |
| 6,101,455 A | * | 8/2000 | Davis | 702/94 |
| 6,108,497 A | * | 8/2000 | Nakayama et al. | 396/429 |
| 6,144,761 A | * | 11/2000 | Kaneko et al. | 382/154 |
| 6,304,669 B1 | * | 10/2001 | Kaneko et al. | 382/154 |
| 6,437,823 B1 | * | 8/2002 | Zhang | 348/187 |

FOREIGN PATENT DOCUMENTS

| | | |
|---|---|---|
| JP | 10141951 | 5/1998 |
| JP | 10170263 | 6/1998 |
| JP | 10185562 | 7/1998 |
| JP | 10185563 | 7/1998 |
| JP | 10221072 | 8/1998 |
| JP | 10293026 | 11/1998 |
| JP | 10307025 | 11/1998 |

OTHER PUBLICATIONS

An English Language abstract of JP 10–185563.
An English Language abstract of JP 10–185562.
An English Language abstract of JP 10–170263.
An English Language abstract of JP 10–307025.
An English Language abstract of JP 10–141951.

* cited by examiner

*Primary Examiner*—Mehrdad Dastouri
(74) *Attorney, Agent, or Firm*—Greenblum & Bernstein, P.L.C.

(57) ABSTRACT

In an image processing computer system for a photogrammetric analytical measurement, a picture has an image of a target with three main reference point areas and an assistant reference point area. Positions of the reference point areas are determined by a two-dimensional picture coordinate system defined on the target. Positions of the main reference point areas are calculated with a three-dimensional camera coordinate system defined on a camera. Positions of the main reference point areas are calculated by a two-dimensional image-plane coordinate system, defined on an image-plane of the camera, based on the calculated three-dimensional positions of the main reference point areas. Camera parameters are calculated based on the two-dimensional positions of the main reference point areas of the picture coordinate system and the positions of the main reference point areas of the image-plane coordinate system.

3 Claims, 22 Drawing Sheets

IMAGE-PROCESSING COMPUTER SYSTEM FOR PHOTOGRAMMETRIC ANALYTICAL MEASUREMENT

BACKGROUND OF THE INVENTION

1. Field of the Invention

The present invention relates to an image-processing computer system for a photogrammetric analytical measurement, in which a survey map is electronically produced based on a pair of photographed pictures obtained at two different photographing positions.

2. Description of the Related Art

For example, photogrammetry is carried out at a traffic accident spot. The traffic accident spot is photographed by an electronic still video digital camera in at least two different positions, and a survey map of the traffic accident spot is produced based on a pair of photographed pictures obtained at the different positions, as disclosed in, for example, Unexamined Japanese Patent Publications No.10-221072 and No.10-293026.

Before accurately scaled distances and lengths can be reproduced on the survey map, a standard measurement scale or target must be recorded together with the photographed objects in the pictures. The target is disclosed in, for example, Unexamined Japanese Patent Publications No.10-141951, No.10-170263, No.10-185562, No.10-185563, No.10-293026 and No.10-307025.

For the production of the survey map, a two-dimensional coordinate system is defined on each of the pictures, and two-dimensional positions of the objects, which are recorded on each picture, are determined by the two-dimensional coordinate system. Also, a three-dimensional coordinate system is defined on the target, and three-dimensional positions of the recorded objects are calculated based on the two-dimensional positions of the objects with respect to the three-dimensional coordinate system. Thus, it is possible to produce a survey map by projecting the three-dimensional coordinates, representing the objects, on one of the three planes defined by the three-dimensional system. Of course, the production of the survey map is performed using an image-processing computer system.

However, before the calculation of the three-dimensional positions of the recorded objects can be performed, it is necessary to determine camera parameters, by which the photographing position of the camera is represented with respect to the three-dimensional coordinate system.

Conventionally, the determination of the camera parameters is performed by correspondingly indicating reference points of the target on scenes of the pictures, displayed on a monitor, by clicking on them with the mouse. This manual indication of the reference points of the target is unreliable. Therefore, unless the manual indication is precisely performed, the determination of the camera parameters is inaccurate, and an accurate proper production of the survey map cannot be ensured.

SUMMARY OF THE INVENTION

Therefore, an object of this invention is to provide an image processing computer system for a photogrammetric analytical measurement, in which camera parameters necessary for production of a survey map can be automatically and precisely determined by suitably processing the image data of a photographed picture.

In accordance with a first aspect of the present invention, there is provided an image processing computer system for a photogrammetric analytical measurement, in which camera parameters necessary for production of a survey map are determined based on a picture having an image of a target. The camera parameters represent a photographing position and a photographing direction of a camera, by which the picture is photographed, and the target has at least three main reference point areas and at least one assistant reference point area, each of the reference point areas being formed as a high luminance point area surrounded by a low luminance area. The image processing computer system comprises: a target-image extractor that extracts the image of the target from the picture based on positional relationships between the main and assistant reference point areas of the target; an image processor that processes the extracted image of the target to determine a two-dimensional position of each of the main and assistant reference point areas of the target with respect to a two-dimensional picture coordinate system defined on the image; a first calculator that calculates three-dimensional positions of the main reference point areas with respect to a three-dimensional camera coordinate system defined on the camera; a second calculator that calculates two-dimensional positions of the main reference point areas with respect to a two-dimensional image-plane coordinate system, defined on an image-plane of the camera, based on the three-dimensional positions of the main reference point areas calculated by the first calculator; and a third calculator that calculates camera parameters based on the two-dimensional positions of the main reference point areas with respect to the two-dimensional picture coordinate system and the two-dimensional positions of the main reference point areas with respect to the two-dimensional image-plane coordinate system.

The image processing computer system may further comprises: a fourth calculator that calculates a three-dimensional position of the assistant reference point area with respect to the three-dimensional camera coordinate system based on the camera parameters calculated by the third calculator; a fifth calculator that calculates a two-dimensional position of the assistant reference point area with respect to the two-dimensional image-plane coordinate system based on the three-dimensional position of the assistant reference point area calculated by the fourth calculator; and a determiner that determines whether the calculation of the camera parameters by the third calculator is correct or incorrect by comparing the two-dimensional position obtained by the image processor with the two-dimensional position of the assistant reference point area calculated by the fifth calculator.

In accordance with a second aspect of the present invention, there is provided an image processing method for a photogrammetric analytical measurement, in which camera parameters necessary for production of a survey map are determined based on a picture having an image of a target. The camera parameters represent a photographing position and a photographing direction of a camera, by which the picture is photographed, and the target has at least three main reference point areas and at least one assistant reference point area, each of the reference point areas being formed as a high luminance point area surrounded by a low luminance area. The image processing method comprises steps of: extracting the image of the target from the picture based on positional relationships between the main and assistant reference point areas of the target; processing the extracted image of the target to determine a two-dimensional position of each of the main and assistant reference point areas of the target with respect to a two-dimensional picture coordinate system defined on the target; calculating three-dimensional positions of the main reference point areas with respect to a three-dimensional camera coordinate system defined on the camera; calculating two-dimensional positions of the main reference point areas with respect to a two-dimensional image-plane coordinate system, defined on an image-plans of the camera, based on the three-dimensional positions of the main reference point areas; and calculating camera parameters based on the two-dimensional positions of the main reference point areas with respect to the two-dimensional picture coordinate system and the two-dimensional positions of the main reference point areas with respect to the two-dimensional image-plane coordinate system.

The image processing method may further comprises the steps of: calculating a three-dimensional position of the assistant reference point area with respect to the three-dimensional camera coordinate system based on the calculated camera parameters; calculating a two-dimensional position of the assistant reference point area with respect to the two-dimensional image-plane coordinate system based on the calculated three-dimensional position of the assistant reference point area; and determining whether the calculation of the camera parameters is correct or incorrect by comparing the two-dimensional position based on the two-dimensional picture coordinate system with the two-dimensional position of the assistant reference point area based on the two-dimensional image-plane coordinate system.

In accordance with a third aspect of the present invention, there is provided a memory medium storing an image processing program in which the aforesaid image processing method is performed.

BRIEF DESCRIPTION OF THE DRAWING

The object and other objects of the present invention will be better understood from the following description, with reference to the accompanying drawings, in which.

DESCRIPTION OF THE PREFERRED EMBODIMENTS

Figure 1:
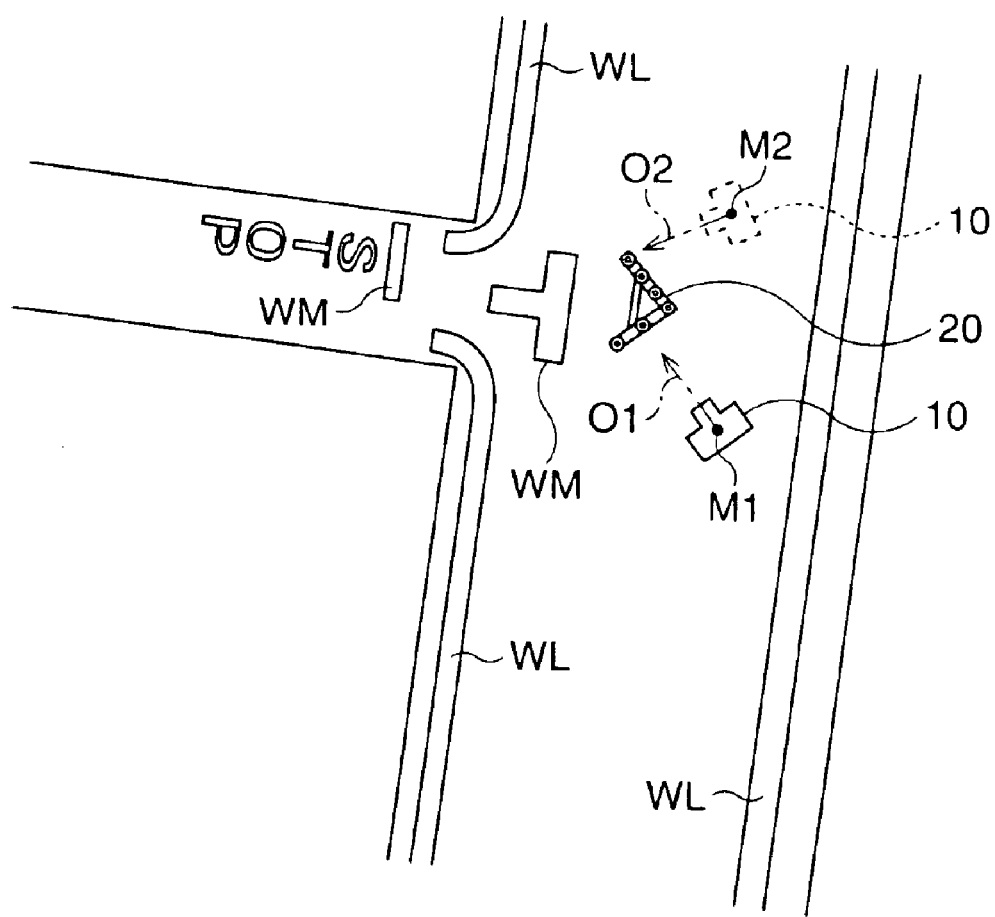
FIG. 1 is a plan view of a roadway for explaining a photogrammetric analytical measurement, which is utilized by a photogrammetric image processing computer system according to the present invention.

With reference to FIG. 1, a part of a roadway is shown as a plan view, by way of example, for explaining a principle of a photogrammetric analytical measurement which utilizes a photogrammetric image processing computer according to the present invention.

In this example, the roadway is photographed by an electronic still video digital camera 10 at two different photographing positions, which are represented by small solid circles indicated by references M1 and M2, respectively. Each of the pictures, photographed at the photographing positions M1 and M2, is processed by a control circuit of the digital camera 10, and is then stored as a frame of image data in a memory medium, such as an IC memory card, held in the camera 10. The memory card is loaded in the photogrammetric image processing computer system according to the present invention, and a survey map of the roadway is produced on the basis of the two frames of image data read from the memory card.

Each of the photographing positions M1 and M2 is defined as a back principal point of a photographing optical lens system of the digital camera 10. As shown in FIG. 1, an arrow is projected from each of the photographing positions M1 and M2 to indicate a photographing direction at the corresponding photographing position (M1, M2). The photographing direction is defined as the orientation of an optical axis (O1, O2) of the photographing optical lens system of the digital camera 10.

Note, in FIG. 1, references WL indicate white lines painted along the sides of the roadway, and references WM indicate white traffic symbols painted on the roadway.

Figure 2:
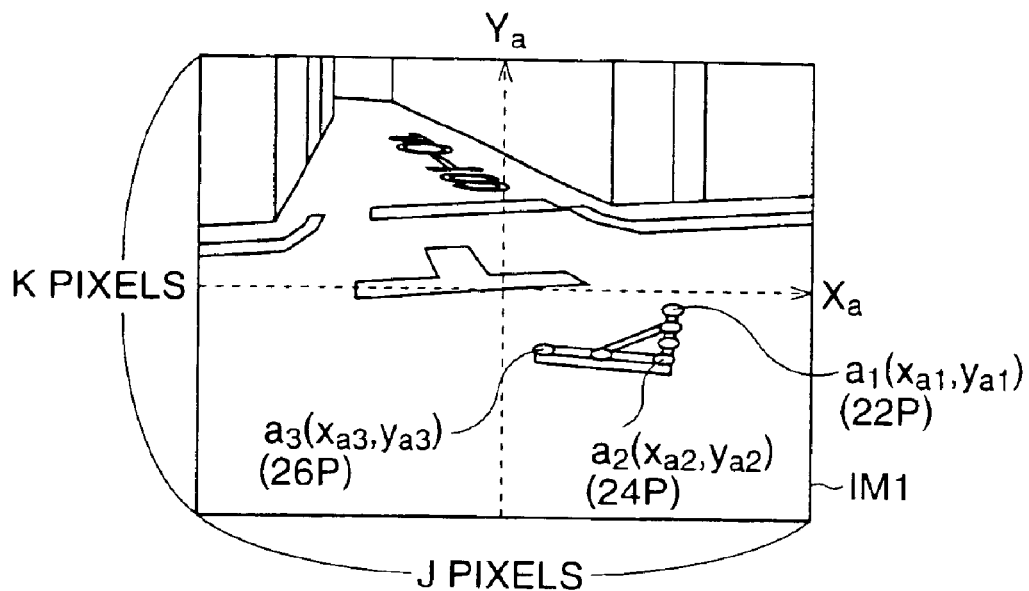
FIG. 2 is a view showing a first scene of a first picture photographed at a first photographing position shown in FIG. 1.
Figure 3:
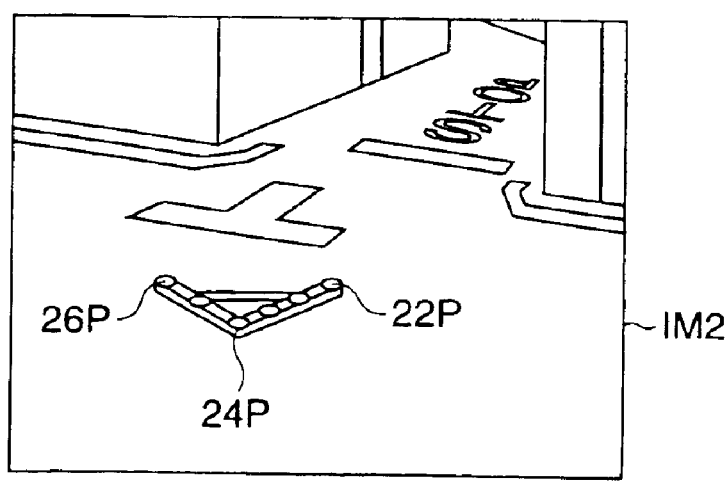
FIG. 3 is a view showing a second scene of a second picture photographed at a second photographing position shown in FIG. 1.

FIGS. 2 and 3 show scenes of the pictures displayed on a monitor connected to the photogrammetric image processing computer system, which are indicated by references IM1 and IM2. Of course, the respective scenes of the pictures IM1 and IM2, shown in FIGS. 2 and 3, correspond to scenes photographed by the camera 10 at the photographing positions M1 and M2. As shown in FIG. 2, the displayed picture IM1 is composed of J×K pixels, and a two-dimensional $X_a$-$Y_a$ coordinate system is defined on the displayed picture IM1 as a picture coordinate system, with the origin thereof being at a center of the picture IM1. Note, similarly for the picture IM2 shown in FIG. 3.

Figure 4:
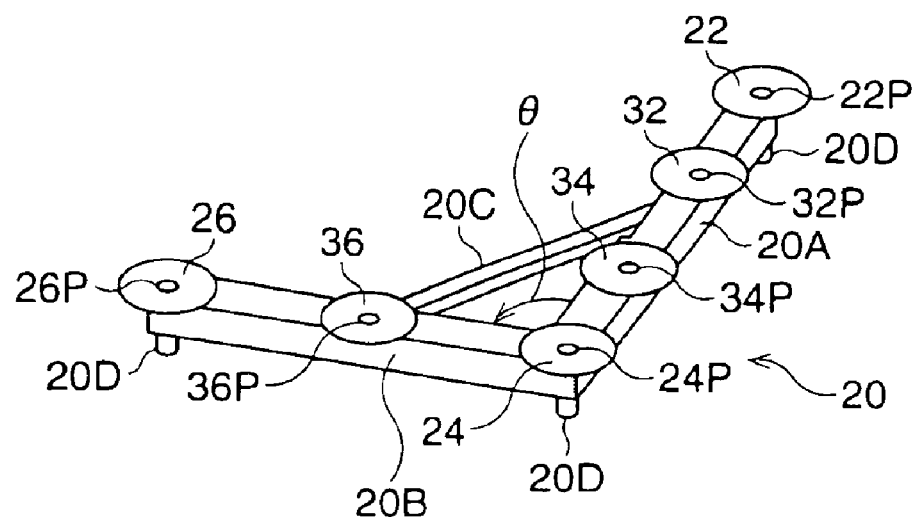
FIG. 4 is a perspective view of a target photographed on the pictures shown in FIGS. 2 and 3.

FIG. 4 perspectively shows the target 20 photographed in both the pictures IM1 and IM2. As is apparent from this drawing, the target 20 is formed as an L-shaped member including two bar elements 20A and 20B, which are joined to each other at their ends so as to form a right angle. The L-shaped member is reinforced with a strut element 20C bridging the bar elements 20A and 20B. In this embodiment, the L-shaped member or target is covered with a suitable non-reflective black sheet. Alternatively, the L-shaped member may be painted black.

The target 20 is provided with three main circular plate-like elements 22, 24 and 26 securely attached thereto, and respective three main reference points 22P, 24P and 26P are defined by the main circular plate-like elements 22, 24 and 26. In this embodiment, each of the circular plate-like elements 22, 24 and 26 is covered with a suitable non-reflective black sheet, and each of the main reference points 22P, 24P and 26P is represented as a small white circle which is formed at the center of the corresponding circular plate-like element (22, 24, 26). For example, the small white circle is defined by adhering a small circular reflective white sheet to the corresponding circular plate-like element (22, 24, 26) at the center thereof. Of course, alternatively, each of the circular plate-like elements 22, 24 and 26 may be painted black, and each small white circle may be formed as a small white circle area painted at the center of the corresponding circular plate-like element (22, 24, 26).

Note, in FIG. 2, the respective reference points 22P, 24P and 26P of the target 20 are represented by coordinates $a_1(x_{a1}, y_{a1})$, $a_2(x_{a2}, y_{a2})$ and $a_3(x_{a3}, y_{a3})$ based on the picture coordinate system ($X_a$-$Y_a$).

A distance between the reference points 22P and 24P is equal to that between the reference points 24P and 26P. Namely, the reference points 22P, 24P and 26P define apexes of an isosceles triangle. The distance between the reference points 22P and 24P or between the reference points 24P and 26P is utilized as a standard measurement scale.

Note, the reference points 22P, 24P and 26P are utilized to determine camera parameters necessary for production of a survey map based on one of the pictures IM1 and IM2, as explained in detail hereinafter.

The target 20 is also provided with three assistant circular plate-like elements 32, 34 and 36 securely attached thereto, and respective three assistant reference points 32P, 34P and 36P are defined by the assistant circular plate-like elements 32, 34 and 36. Each of the assistant circular plate-like elements 32, 34 and 36 is formed in substantially the same manner as the main circular plate-like element (22, 24, 26). As is apparent from FIG. 4, the assistant plate-like elements 32 and 34 are arranged along the bar element 20A at regular intervals between the main circular plate-like element 22 and 24, and the remaining assistant plate-like 36 is arranged on the bar element 20B at a center between the main circular plate-like elements 24 and 26.

Note, the assistant reference points 32P, 34P and 36P are utilized in conjunction with the main reference points 22P, 24P and 26P to confirm whether the determination of the camera parameters is correct, as explained in detail hereinafter.

The target 20 is further provided with three protrusions 20D protruded from the underside of the L-shaped member at respective locations corresponding to the main reference points 22P, 24P and 26P. The target 20 is located on the roadway such that the protrusions 20D are in contact with a surface of the roadway, resulting in a stable placement of the target on the roadway.

The target 20 includes a tilt-angle sensor, as disclosed in Unexamined Japanese Patent Publication No. 10-185563. The tilt-angle sensor detects a tilt-angle of the target 20 to a horizontal plane when being located on the roadway, and outputs a tilt-angle signal representing the detected tilt-angle of the target 20. The target 20 also includes a signal processor for processing the signal output from the tilt-angle sensor, and a radio transmitter for transmitting the processed signal to a receiver provided in the camera 10. The transmission of the signal from the radio transmitter is repeated at regular intervals of very short time. Whenever a photographing operation is performed by the camera 10, the transmitted signal is retrieved from the receiver by the control circuit of the camera 10. The retrieved signal is processed by the control circuit of the camera 10, and is then stored in the memory card, together with a corresponding frame of image data obtained during the photographing operation.

Figure 5:
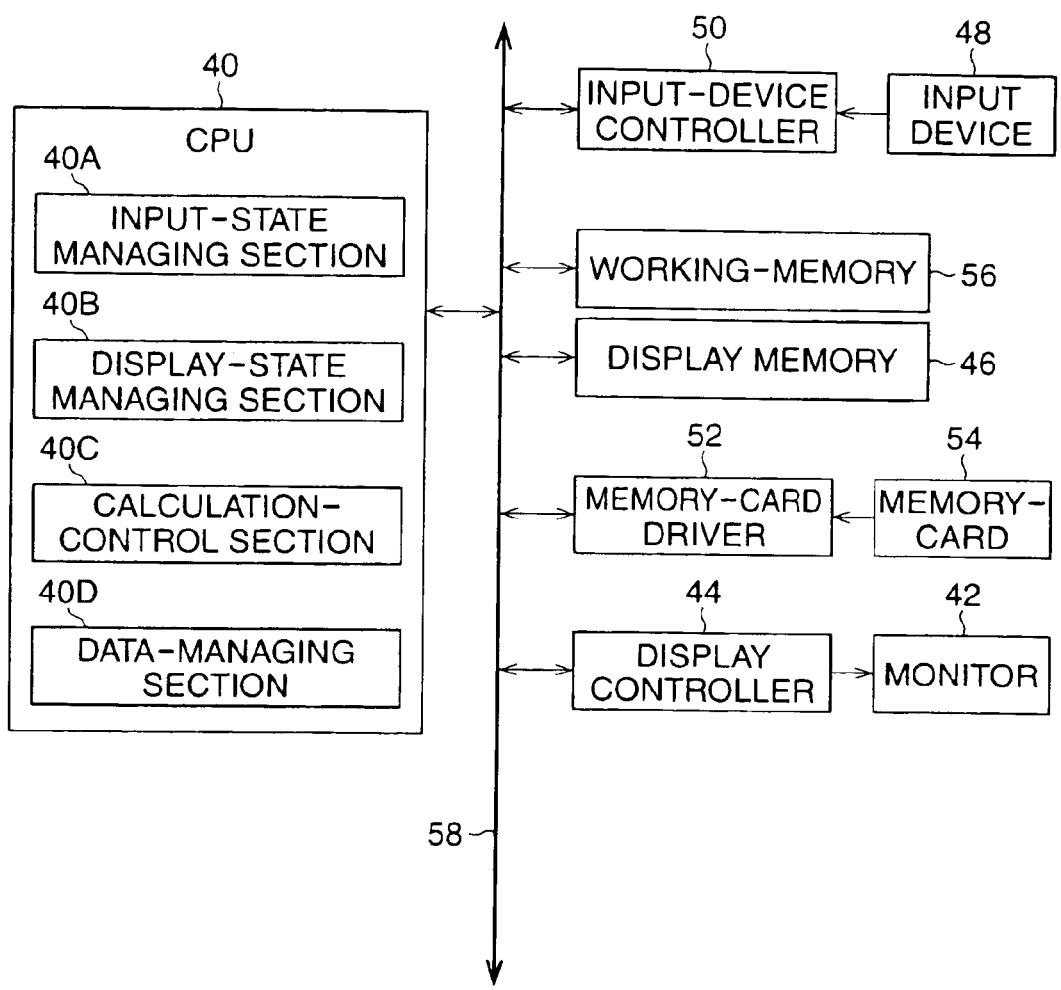
FIG. 5 is a block diagram of the photogrammetric image processing computer system according to the present invention.

With reference FIG. 5, the photogrammetric image processing computer system according to the present invention is shown as a block diagram.

As shown in FIG. 5, the image processing computer system comprises: a central processing unit (CPU) 40; a display device 42, such as a monitor; a display controller 44 for controlling the monitor 42; a display memory 46 for storing image data on which a scene to be displayed on the display device or monitor 42 is based; an input device 48 including a keyboard and a mouse; an input-device controller 50 for controlling the input device 48; a memory-card driver 52 for loading the memory card, indicated by reference 54; and a working memory 56 used as a cache memory when executing calculations and processings in the CPU 40. The input-device controller 50, the working memory 56, the display memory 46, the memory-card driver 52 and the display controller 44 are connected to the CPU 40 via a bus 58.

As conceptually shown in FIG. 5, the CPU 40 includes an input-state managing section 40A, a display-state managing section 40B, a calculation-control section 40C and a data-managing section 40D.

The input-state managing section 40A manages various information data and command data input through the input device 48. For example, when a cursor or pointer is moved on a scene display on the monitor 42 by manipulating the mouse of the input device 48, the movement of the pointer is managed by the input-state managing section 40A. The input-state managing section 40A also monitors whether character code data is input via the keyboard of the input device 48, and when character code data is input, the character code data is converted into character image data, which is output to the display memory 46, whereby character images are displayed on the monitor 42.

The display-state managing section 40B manages a scene to be displayed on the monitor 42. For example, when at least a part of the scene displayed on the monitor 42 is changed, the change of the scene is managed by the display-state managing section 40B. Namely, writing of image data in the display memory 46 is controlled by the display-state managing section 40B, thereby changing the scene displayed on the monitor 42. The display controller 44 reads the image data from the display memory 46 at regular intervals of given short time, and converts the read image data into three primary (red, green and blue) video data.

The calculation-control section 40C executes various calculations and processings for producing a survey map of the roadway, as stated in detail hereinafter.

The data-managing section 40D manages various data read from the memory card 54 through the memory-card driver 52, survey map data, various data necessary for producing the survey map data and so on.

For the production of the survey map based on the pair of pictures IM1 and IM2 (FIGS. 2 and 3), initially, the photographing positions M1 and M2 and the photographing directions (which are represented by the orientations of the optical axes O1 and O2, respectively) are spatially determined on the pictures IM1 and IM2.

Figure 6:
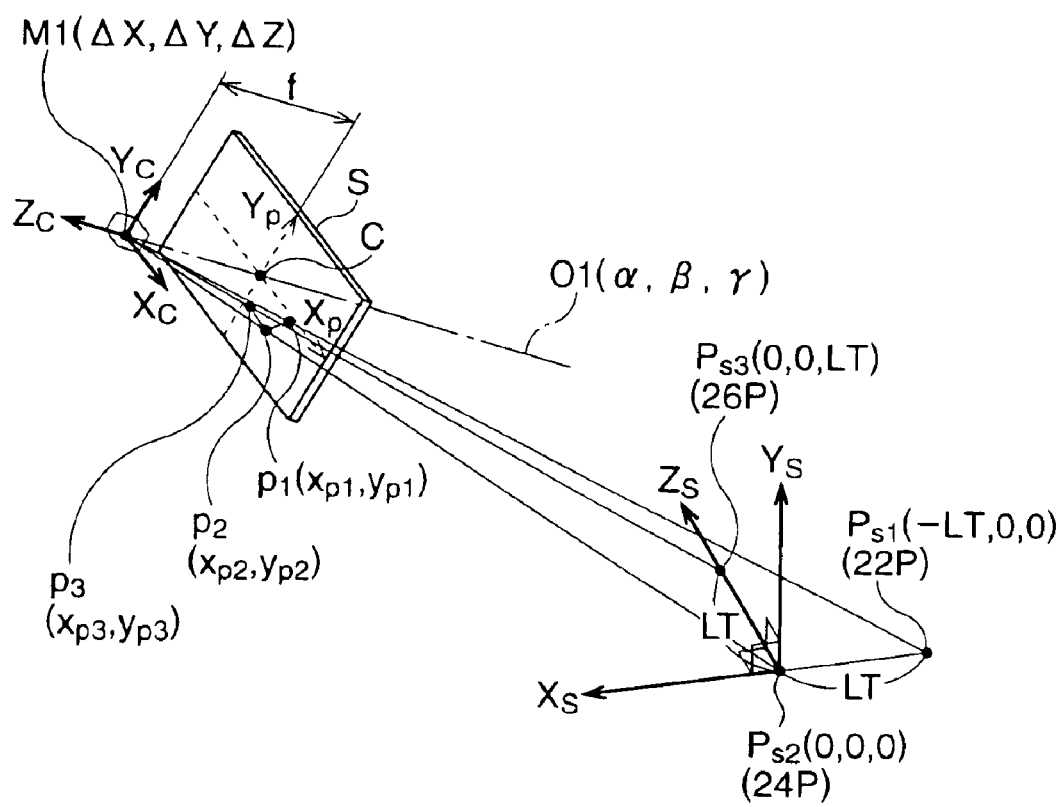
FIG. 6 is a conceptual perspective view showing a positional relationship between the target and a camera utilized in the photogrammetric analytical measurement.

With reference to FIG. 6, the spatial determination of the photographing position M1 and the photographing direction O1 will be representatively explained below.

Note, in this drawing, a positional relationship between the camera 10 and the target 20 is geometrically and conceptually shown when performing the photographing operation at the photographing position M1.

In FIG. 6, reference S indicates an image plane defined by the photographing optical lens system of the camera 10, reference C indicates a center of the image plane S, and reference f indicates a focal distance defined as a distance between the center C of the image plane S and the photographing position (or back principal point) M1. Of course, when the photographing operation is performed at the photographing position M1, a photographed scene, formed on the image plane S, corresponds to the scene of picture IM1 displayed on the monitor 42.

As shown in FIG. 6, a three-dimensional $X_S$-$Y_S$-$Z_S$ coordinate system is defined on the target 20 as a target coordinate system such that the origin of the target coordinate system ($X_S$-$Y_S$-$Z_S$) is at the reference point 24P of the target 20, with the $X_S$-axis and the $Z_S$-axis coinciding with a line segment between the reference points 22P and 24P and a line segment between the reference points 24P and 26P, respectively. Of course, both the $X_S$-axis and the $Z_S$-axis are perpendicular to the $Y_S$-axis.

The survey map is produced by projecting three-dimensional coordinates, representing an image point, on a plane defined by the $X_S$-axis and the $Z_S$-axis of the target coordinate system ($X_S$-$Y_S$-$Z_S$), and the plane concerned must be horizontal before the production of the survey map can be properly performed. Nevertheless, the target 20 may not necessarily be horizontally positioned on the roadway. If the target 20 is tilted with respect to a horizontal plane, the plane concerned is also tilted. The tilt of the target 20 is corrected based on the tilt-angle data, which is derived from the tilt-angle signal transmitted from the radio transmitter of the target 20. Thus, although the target 20 is tilted, it is possible to properly perform the definition of the target coordinate system ($X_S$-$Y_S$-$Z_S$).

As shown in FIG. 6, the distance between the reference points 22P and 24P is represented by reference LT, and thus the distance between the reference points 24P and 26P can be represented by the same reference LT, because the respective line segments between the reference points 22P and 24P and between the reference points 24P and 26P have the same length, as mentioned above. Accordingly, with respect to the target coordinate system ($X_S$-$Y_S$-$Z_S$), the respective main reference points 22P, 24P and 26P are represented by the coordinates $P_{s1}$(-LT, 0, 0), $P_{s2}$(0, 0, 0) and $P_{s3}$(0, 0, LT), as shown in FIG. 6. Note, although not shown in FIG. 6, the respective assistant reference points 32P, 34P and 36P are represented by the coordinates $P_{s4}$(-2LT/3, 0, 0), $P_{s5}$(-LT/3, 0, 0) and $P_{s6}$(0, 0, LT/2).

In order to determine the photographing position (or back principal point) M1 with respect to the target coordinate system ($X_S$-$Y_S$-$Z_S$), a two-dimensional $X_p$-$Y_p$ coordinate system is defined on the image plane S as an image-plane coordinate system, and a three-dimensional $X_C$-$Y_C$-$Z_C$ coordinate system is defined on the camera 10 as a camera coordinate system, as shown in FIG. 6.

The origin of the image-plane-coordinate system ($X_p$-$Y_p$) is at the center C of the image plane S. When the photographing operation is performed at the photographing position M1, the reference points 22P, 24P and 26P of the target 20, formed and recorded on the image-plane S, are represented by coordinates $p_1(x_{p1}, y_{p1})$, $p_2(x_{p2}, y_{p2})$ and $p_3(x_{p3}, y_{p3})$ based on the image-plane coordinate system ($X_p$-$Y_p$). The respective coordinates $p_1(x_{p1}, y_{p1})$, $p_2(x_{p2}, y_{p2})$ and $p_3(x_{p3}, y_{p3})$ essentially coincide with the coordinates $a_1(x_{a1}, y_{a1})$, $a_2(x_{a2}, y_{a2})$ and $a_3(x_{a3}, y_{a3})$ based on the picture coordinate system ($X_a$-$Y_a$) defined on the picture IM1 displayed on the monitor 42 (FIG. 2), because the image-plane coordinate system ($X_p$-$Y_p$) and the picture coordinate system ($X_a$-$Y_a$) are essentially identical to each other.

As is apparent from FIG. 6, the origin of the camera coordinate system ($X_C$-$Y_C$-$Z_C$) coincides with the back principal point (M1), the $Z_C$-axis coincides with the optical axis O1, and the $X_C$-axis and the $Y_C$-axis are in parallel to the $X_p$-axis and the $Y_p$-axis of the two-dimensional coordinate system ($X_p$-$Y_p$) respectively. The origin of the camera coordinate system ($X_C$-$Y_C$-$Z_C$) or photographing position M1, is represented by three-dimensional coordinates M1($\Delta X$, $\Delta Y$, $\Delta Z$) which are based on the target coordinate system ($X_S$-$Y_S$-$Z_S$). An orientation of the $Z_C$-axis or optical axis O1 is represented by three-dimensional angular coordinates ($\alpha$, $\beta$, $\gamma$) which are defined with respect to the target coordinate system ($X_S$-$Y_S$-$Z_S$). Namely, the $Z_C$-axis or optical axis O1 defines angles of $\alpha$, $\beta$ and $\gamma$ with the $X_S$-axis, $Y_S$-axis and $Z_S$-axis of the target coordinate system ($X_S$-$Y_S$-$Z_S$), respectively.

Note, the three-dimensional coordinates M1($\Delta X$, $\Delta Y$, $\Delta Z$) and the three-dimensional angular coordinates ($\alpha$, $\beta$, $\gamma$) are referred to as camera parameters ($\Delta X$, $\Delta Y$, $\Delta Z$, $\alpha$, $\beta$, $\gamma$) for representing the photographing position M1.

When two-dimensional coordinates $p_i(x_{pi}, y_{pi})$ (i=1, 2, 3), representing the coordinates $p_1(x_{p1}, y_{p1})$, $p_2(x_{p2}, y_{p2})$ and $p_3(x_{p3}, y_{p3})$ based on the image-plane coordinate system ($X_p$-$Y_p$) are expressed by three-dimensional coordinates $P_{ci}(P_{cxi}, P_{cyi}, P_{czi})$ based on the camera coordinate system ($X_C$-$Y_C$-$Z_C$), the X-coordinate $x_{pi}$ and the Y-coordinate $y_{pi}$ are represented by the following formulas (1) and (2), respectively $$x_{pi} = f \times \frac{P_{cxi}}{P_{czi}} \quad (1)$$

$$y_{pi} = f \times \frac{P_{cyi}}{P_{czi}} \quad (2)$$

Herein: "i"=1, 2, 3, and "f" is the focal distance.

On the other hand, the three-dimensional coordinates $P_{ci}(P_{cxi}, P_{cyi}, P_{cxi})$ based on the camera coordinate system ($X_C$-$Y_C$-$Z_C$) is expressed by three-dimensional coordinates $P_{si}(P_{sxi}, P_{syi}, P_{szi})$ based on the target coordinate system ($X_S$-$Y_S$-$Z_S$), as follows:

$$P_{ci} = R(P_{si} - \Delta) \quad (3)$$

$$R = \begin{pmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\sin\gamma & -\cos\alpha\cos\gamma - \sin\alpha\sin\beta\sin\gamma & \sin\alpha\cos\gamma + \cos\alpha\sin\beta\sin\gamma \\ \sin\beta & -\sin\alpha\cos\beta & \cos\alpha\cos\beta \end{pmatrix}$$

$$\Delta = \begin{pmatrix} \Delta X \\ \Delta Y \\ \Delta Z \end{pmatrix}$$

Herein: "R" is a rotational matrix of the angle $\alpha$, $\beta$ and $\gamma$, and "$\Delta$" is a vector representing a movement distance of the origin of the camera coordinate system ($X_C$-$Y_C$-$Z_C$) from the origin of the target coordinate system ($X_S$-$Y_S$-$Z_S$).

Thus, it is possible to calculate the three-dimensional coordinates M1($\Delta X$, $\Delta Y$, $\Delta Z$) and the three-dimensional angular coordinates ($\alpha$, $\beta$, $\gamma$) by the formulas (1), (2) and (3), whereby the photographing position M1 is spatially determined with respect to the target coordinate system ($X_S$-$Y_S$-$Z_S$).

In particular, the camera parameters ($\Delta X$, $\Delta Y$, $\Delta Z$, $\alpha$, $\beta$, $\gamma$) are calculated, using a sequential-approximation method. Namely, the calculation of the camera parameters ($\Delta X$, $\Delta Y$, $\Delta Z$, $\alpha$, $\beta$, $\gamma$) are performed such that a value $\Phi$ of the following formula (4) is minimized:

$$\Phi = \sum_{i=1}^{3} \{(x_{pi} - x_{ai})^2 + (y_{pi} - y_{ai})^2\} \quad (4)$$

Note, at the beginning of the calculation, settings of suitable initial values are given to the camera parameters ($\Delta X$, $\Delta Y$, $\Delta Z$, $\alpha$, $\beta$, $\gamma$). For example, in order to facilitate the sequential-approximation calculation, the camera parameters ($\Delta X$, $\Delta Y$, $\Delta Z$, $\alpha$, $\beta$, $\gamma$) may be set as $\Delta X=0$ m, $\Delta Y=1.5$ m, $\Delta Z=0$ m, $\alpha=0°$, $\beta=0°$ . . . 360° and $\gamma=0°$. Namely, the initial value $\Delta Y$ of 1.5 m is selected as an approximate height of the camera 10 measured from the ground when photographing, and the initial value of $\beta$ may be empirically selected from the range from 0° to 360° on the basis of the scene of the picture IM1.

Note, of course, camera parameters ($\Delta X$, $\Delta Y$, $\Delta Z$, $\alpha$, $\beta$, $\gamma$), representing the photographing position M2 of the picture IM2, can be calculated in substantially the same manner as mentioned above.

Figure 7:
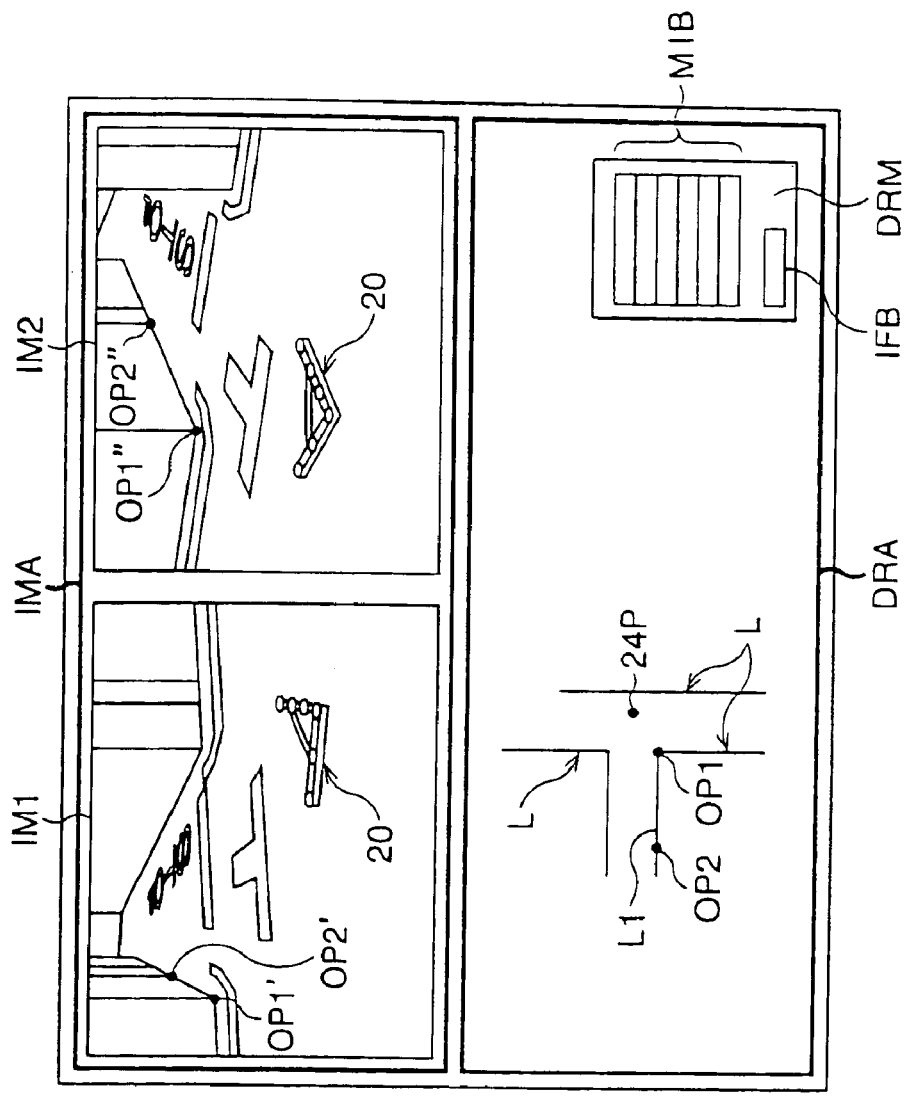
FIG. 7 is a view showing a map-production-mode scene displayed on a TV monitor forming a part of the photogrammetric image processing computer system shown in FIG. 5.

The calculated camera parameters ($\Delta X$, $\Delta Y$, $\Delta Z$, $\alpha$, $\beta$, $\gamma$) concerning the photographing positions M1 and M2 are once stored in working memory 56, and then the survey map of the roadway is produced, using the camera parameters ($\Delta X$, $\Delta Y$, $\Delta Z$, $\alpha$, $\beta$, $\gamma$), by displaying a map-production scene on the monitor 42, as shown, by way of example, in FIG. 7.

In particular, as shown in FIG. 7, the map-production scene includes a pair-picture-display area IMA and a map-production-display area DRA positioned below the pair-picture-display area IMA. The pair of pictures IM1 and IM2 is displayed on the pair-picture-display area IMA, and an unfinished survey map is displayed on the map-production-display area DRA. Note, the map-production-display area DRA corresponds to the plane defined by the $X_S$-axis and the $Z_S$-axis of the target coordinate system ($X_S$-$Y_S$-$Z_S$).

For example, an object point OP1, shown on the survey map, corresponds to a photographed object point OP1' on the picture IM1, and corresponds to a photographed object point OP1" on the picture IM2. By indicating the object points OP1' and OP1" by clicking on them with the mouse, a position of the object point OP1 is determined on the map-production-display area DRA, using the camera parameters ($\Delta X$, $\Delta Y$, $\Delta Z$, $\alpha$, $\beta$, $\gamma$). Also, an object point OP2, shown on the survey map, corresponds to a photographed object point OP2' on the picture IM1, and corresponds to a photographed object point OP2" on the picture IM2. Similarly, by indicating the object points OP2' and OP2" by clicking on them with the mouse, a position of the object point OP2 is determined on the map-production-display area DRA, using the camera parameters ($\Delta X$, $\Delta Y$, $\Delta Z$, $\alpha$, $\beta$, $\gamma$).

Note, in reality, when the object point (OP1', OP1", OP2', OP2") is indicated by clicking on it with the mouse, the indicated object point is displayed as a colored small dot on the picture (IM1, IM2).

After the determination of the two object points OP1 and OP2, a line segment L1 is drawn and displayed between the object points OP1 and OP2, as shown in FIG. 7. The drawing of the line segment L1 is performed by previously selecting and setting a straight-line-drawing mode in a drawing-menu window DRM displayed on the map-production-display area DRA.

The drawing-menu window DRM has plural item-buttons, representatively indicated by reference MIB, which correspond to various line-drawing modes. Of course, one of the line-drawing modes is the aforesaid straight-line-drawing mode, and other modes may be a curved-line-drawing mode, a diameter-designated-circular-drawing mode, a radius-designated-circular-drawing mode, a polygon-drawing mode and so on. Of course, one of the line-drawing modes is selected and set by operating a corresponding item button MIB by clicking on it with the mouse. Further, the drawing-menu window DRM has an input-fixing button IFB, which is operated by clicking on it with the mouse after object points necessary for drawing a line segment or line segments are displayed on the display area DRA.

In short, in the aforesaid example, after the object points OP1 and OP2 are displayed on the map-production-display area DRA, the drawing of the line-segment L1 between the displayed object points OP1 and OP2 is performed by the operation of the input-fixing button IFB provided that the straight-line-drawing mode is selected and set. Thus, by successively and correspondingly indicating plural pairs of object points, representing the roadway, on the pictures IM1 and IM2 in the same manner as mentioned above, it is possible to draw and display various lines L on the map-production-display area DRA.

According to the present invention, as stated in detail hereinafter, the two-dimensional coordinates $a_1(x_{a1}, y_{a1})$, $a_2(x_{a2}, y_{a2})$ and $a_3(x_{a3}, y_{a3})$ are automatically and precisely read from the picture (IM1, IM2), and thus the camera parameters ($\Delta X$, $\Delta Y$, $\Delta Z$, $\alpha$, $\beta$, $\gamma$) can be accurately determined, whereby a reliable production of a survey map can be ensured. Also, since the accurate determination of the camera parameters ($\Delta X$, $\Delta Y$, $\Delta Z$, $\alpha$, $\beta$, $\gamma$) are previously performed, resulting in a facilitation of the production of the survey map.

Conversely, conventionally, the determination of the camera parameters ($\Delta X$, $\Delta Y$, $\Delta Z$, $\alpha$, $\beta$, $\gamma$) is performed by correspondingly indicating the reference points 22P, 24P and 26P of the target 20 on the displayed pictures IM1 and IM2 by clicking on them with the mouse. Namely, the determination of the camera parameters ($\Delta X$, $\Delta Y$, $\Delta Z$, $\alpha$, $\beta$, $\gamma$) is based on the two-dimensional coordinates $a_1(x_{a1}, y_{a1})$, $a_2(x_{a2}, y_{a2})$ and $a_3(x_{a3}, y_{a3})$ obtained by the manual indication of the reference points 22P, 24P and 26P of the target 20 on the displayed pictures IM1 and IM2 in the same manner as the aforesaid manual indication of the object points (OP1', OP2'; OP2', OP2"). Of course, unless the manual indication of the reference points 22P, 24P and 26P of the target 20 is precisely performed, the determined camera parameters are unreliable, due to the imprecise manual indication of the reference points, and thus a proper production of the survey map cannot be ensured.

Figure 8:
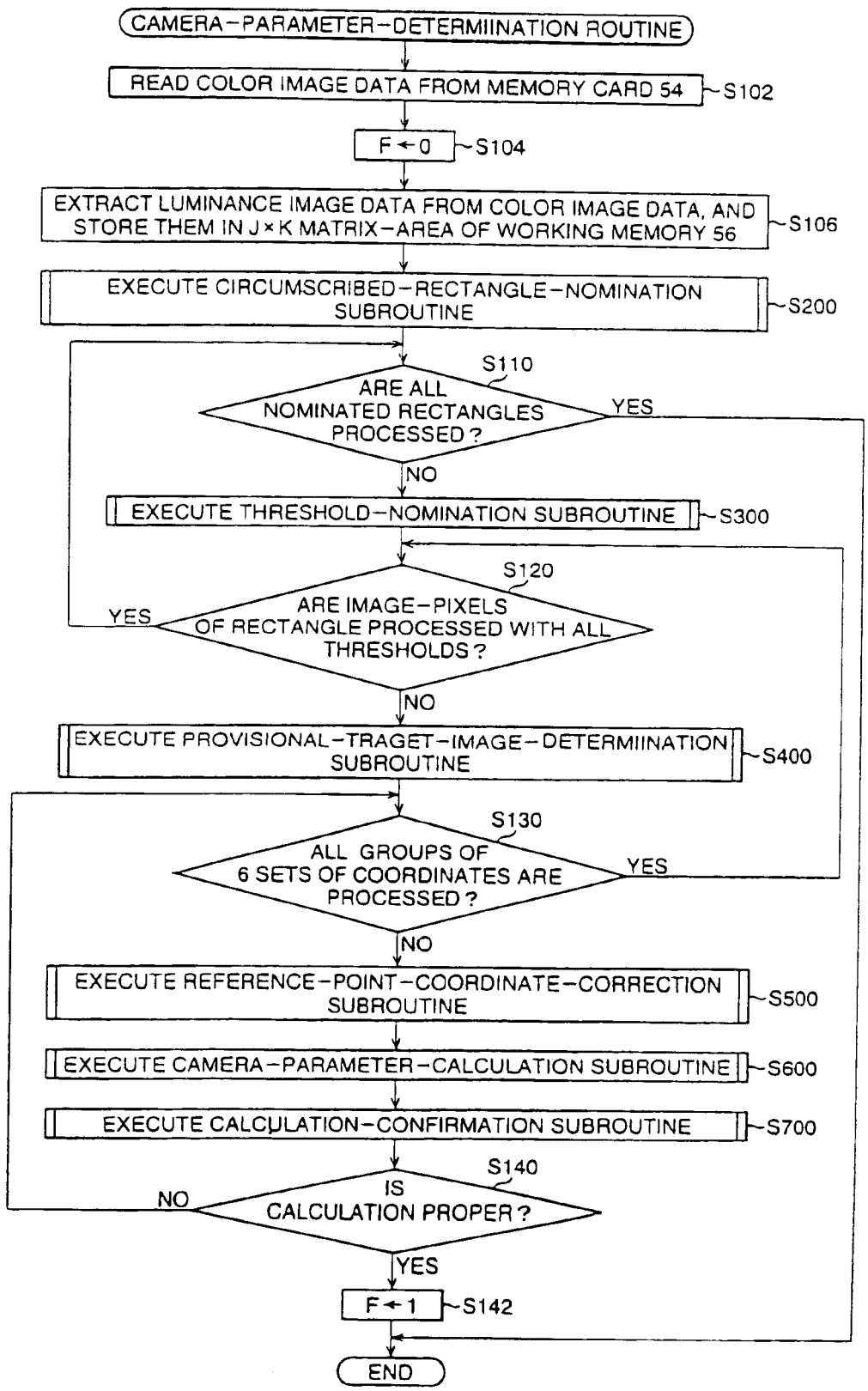
FIG. 8 is a flowchart of a camera-parameter-determination routine executed in the photogrammetric image processing computer system shown in FIG. 5.

FIG. 8 shows a flowchart of a camera-parameter-determination routine, which forms a part of a main routine for producing a survey map based on a pair of pictures, and which is executed in the image-processing computer system shown in FIG. 5.

At step S102, a frame of color image data is read from the memory card 54, and is stored in the working memory 56. Then, at step S104, a flag F is made to be "0". The flag F indicates whether a determination of camera-parameters ($\Delta X$, $\Delta Y$, $\Delta Z$, $\alpha$, $\beta$, $\gamma$) has been completed. Note, of course, when the determination of the camera parameters is incomplete, the setting of 0 is given to the flag F, and when the determination of the camera parameters has been completed, a setting of 1 is given to the flag F, as explained hereinafter.

At step S106, a frame of luminance image data is extracted from the frame of color image data, stored in the working memory 56, for example, corresponding to the picture IM1 photographed at the photographing position M1, and is then stored in a J×K matrix-area defined in the working memory 56. In this embodiment, the frame of luminance image data is composed of the J×K pixels (FIG. 2). Thus, the luminance image pixels included in one frame are stored in the J×K matrix-area of the working memory 56, and each image pixel with a certain luminance level is represented by a variable $IM_g(j, k)$.

Note, in this embodiment, the luminance image pixels are sorted by 256 luminance levels, i.e. each image pixel is represented by 8 bits.

At step S200, a circumscribed-rectangle-nomination subroutine is executed. By the execution of this subroutine, rectangles, each of which is presumed to be substantially circumscribed about an image of the target 20, are defined in and nominated from the J×K matrix-area of the working memory 56. In short, the nomination of plural circumscribed-rectangles, each of which is presumed as including the image of the target 20, is performed. At this stage, it is impossible to find out which circumscribed-rectangle actually includes the image of the target 20. Note, the circumscribed-rectangle-determination subroutine is explained in detail hereinafter with reference to FIG. 9.

At step S110, it is determined whether all the nominated circumscribed-rectangles are processed, thereby finding out which circumscribed-rectangle encompasses the image of the target 20. Note, if there is no circumscribed-rectangle to be nominated by the execution of the circumscribed-rectangle-nomination subroutine, the camera-parameter-determination routine immediately ends, with the setting of "0" being given to the flag F, and an error message is displayed on the monitor 42 to announce that the determination of the camera parameters is impossible.

At step S300, a threshold-nomination subroutine is executed, thereby nominating thresholds based on the image pixels, encompassed by one of the nominated circumscribed-rectangles, for performing binarization of that image pixels. Note, the threshold-nomination subroutine is explained in detail hereinafter with reference to FIG. 12.

At step S120, it is determined whether the image pixels, encompassed by the circumscribed-rectangle concerned, are processed with all the individual thresholds nominated by the execution of the thresholds-nomination subroutine (S300).

When it is confirmed that the image pixels are processed with all the individual thresholds, the control returns to step S110. Then, if the processings of all the nominated circumscribed-rectangles are not still completed, the threshold-nomination subroutine (S300) is further executed, thereby nominating some thresholds based on the image pixels encompassed by another one of the circumscribed-rectangles.

At step 400, a provisional-target-image-determination subroutine is executed, thereby provisionally determining whether the circumscribed-rectangle concerned includes at least one image, which may be presumed as the image of the target 20, based on the image pixels processed with one of the thresholds nominated by the execution of the thresholds-nomination subroutine (S300).

In the execution of the provisional-target-image-determination subroutine (S400), when the circumscribed-rectangle concerned includes an image, which may be presumed as the image of the target 20, the image is represented by six sets of coordinates, corresponding to the reference points 22P, 24P, 26P, 32P, 34P and 36P of the target 20, based on the picture coordinate system ($X_a$-$Y_a$). According to circumstances, two or more images, each of which may be presumed as the image of the target 20, are included in the circumscribed-rectangle concerned. In this case, the two or more groups of respective six sets of coordinates, corresponding to the reference points 22P, 24P, 26P, 32P, 34P and 36P, are obtained by the execution of the provisional-target-image-determination subroutine.

Note, the provisional-target-image-determination subroutine is explained in detail hereinafter with reference to FIG. 14.

At step 130, it is determined whether all the groups of six sets of coordinates, corresponding to the reference points 22P, 24P, 26P, 32P, 34P and 36P, are processed, thereby confirming whether the respective six sets of coordinates, included in each group, truly represent the reference points 22P, 24P, 26P, 32P, 34P and 36P.

At step S130, when it is confirmed that all the groups of six sets of center-coordinates are processed, the control returns to step S120. When the processing of the image pixels (encompassed by the circumscribed-rectangle concerned) with all the individual thresholds is not still completed, the provisional-target-image determination subroutine (S400) is further executed, thereby provisionally determining whether the circumscribed-rectangle concerned includes at least one image, which may be presumed as the image of the target 20, using the image pixels processed with another one of the thresholds nominated by the execution of the thresholds-nomination subroutine (S300).

At step S500, a reference-point-coordinate-correction subroutine is executed, thereby correcting the six sets of coordinates, corresponding to the reference points 22P, 24P, 26P, 32P, 34P and 36P of the target 20, obtained by the execution of the provisional-target-image-determination subroutine (S400). Namely, it is possible to more accurately determine the six sets of coordinates by the execution of the reference-point-coordinate-correction subroutine. Note, the reference-point-coordinate-correction subroutine is explained in detail hereinafter with reference to FIG. 18.

At step S600, a camera-parameter-calculation subroutine is executed, thereby calculating camera parameters ($\Delta X$, $\Delta Y$, $\Delta Z$, $\alpha$, $\beta$, $\gamma$) based on the three sets of coordinates, corresponding to the reference points 22P, 24P and 26P of the target 20. Note, the camera-parameter-calculation subroutine is explained in detail hereinafter with reference to FIG. 25.

At step S700, a calculation-confirmation subroutine is executed, thereby confirming whether the calculation of the camera parameters ($\Delta X$, $\Delta Y$, $\Delta Z$, $\alpha$, $\beta$, $\gamma$) is properly performed, using the three sets coordinates corresponding to the assistant reference points 32P, 34P and 36P of the target 20. Note, the calculation-confirmation subroutine is explained in detail hereinafter with reference to FIG. 26.

At step S140, it is determined whether the calculation of the camera parameters of the ($\Delta X$, $\Delta Y$, $\Delta Z$, $\alpha$, $\beta$, $\gamma$) is correct. When the calculation of the camera parameters is correct, the control proceeds to step S142, in which the flag F is set to "1". On the other hand, if the calculation of the camera parameters is not correct, the control returns to step S110 via steps S130 and S120, and the routine comprising steps S300, S120, S400, S130, S500, S600, S700 and S140 is executed with respect to another one of the circumscribed-rectangles nominated by the execution of the circumscribed-rectangle-nomination subroutine (S200).

Figure 9:
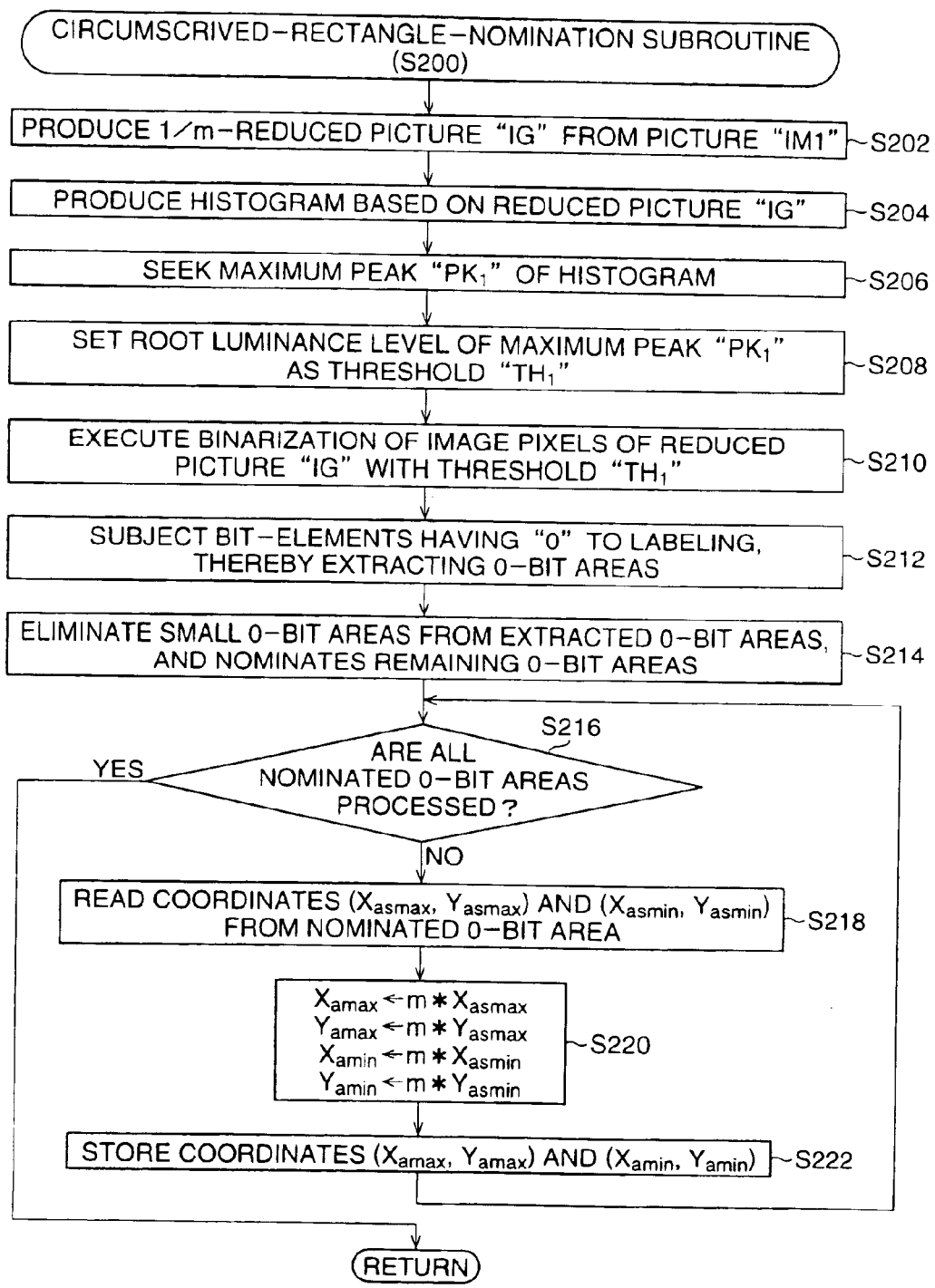
FIG. 9 is a flowchart of a circumscribed-rectangle-nomination subroutine executed in step S200 of the camera-parameter-determination routine of FIG. 8.

FIG. 9 shows a flowchart of the circumscribed-rectangle-nomination subroutine executed in step S200 of the camera-parameter-determination routine shown in FIG. 8.

Figure 10:
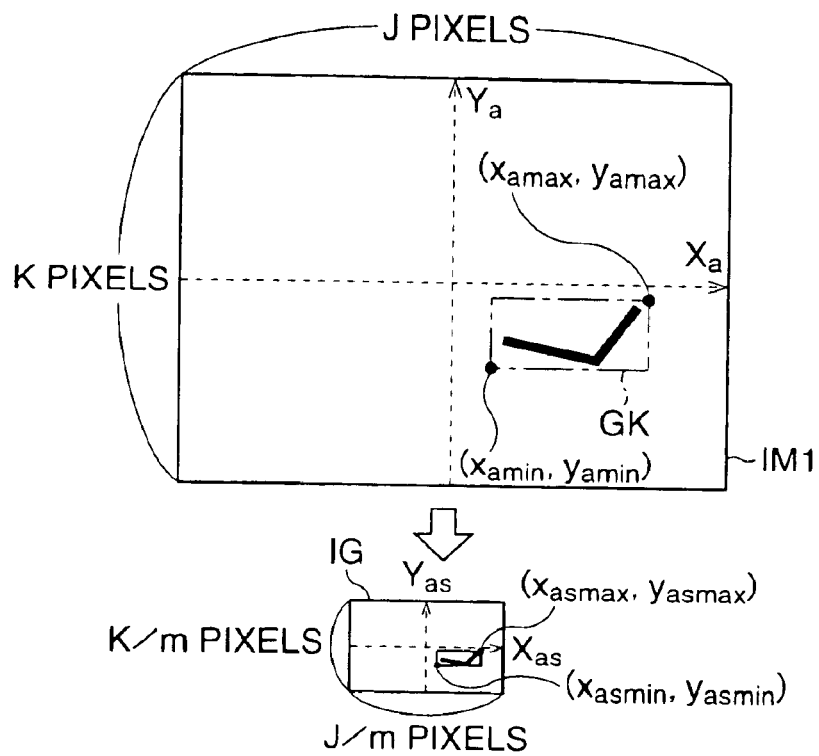
FIG. 10 is a conceptual view showing the first picture together with a reduced picture thereof, for explaining a production of a rectangle circumscribed about an image of the target on the first pictures.

At step S202, an 1/m reduced picture IG is produced from the J×K picture IM1, as conceptually shown in FIG. 10. Namely, one pixel is selected from m consecutive pixels in each of the horizontal lines of the picture IM1 along the $X_a$-axis of the picture coordinate system ($X_a$-$Y_a$), and one pixel is selected from m consecutive pixels in each of the vertical lines of the picture IM1 along the $Y_a$-axis of the picture coordinate system ($X_a$-$Y_a$). The selected pixels are stored in a s×t matrix area defined in the working memory 56, and each image pixel with a certain luminance level is represented by a variable $IG_s(s, t)$. Note, of course, the reduced picture IG is composed of J/m×K/m pixels, and each element of the s×t matrix area is represented by 8-bits.

Note, as shown in FIG. 10, a two-dimensional $X_{as}$-$Y_{as}$ coordinate system is defined with respect to the reduced picture IG, an origin of which is at a center of the reduced picture IG.

Figure 11:
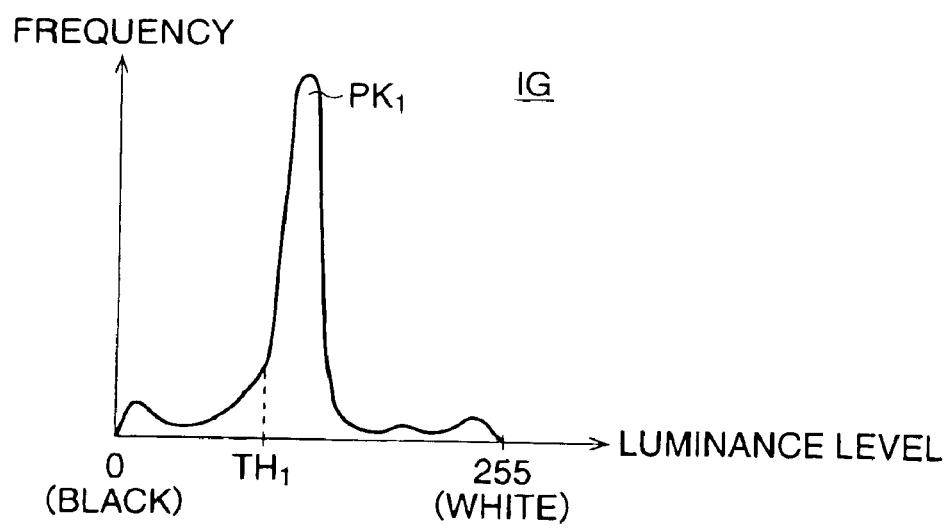
FIG. 11 is a histogram based on image pixels included in the reduced picture shown in FIG. 10.

At step S204, a histogram is produced based on the reduced picture IG, using the variable $IG_s(s, t)$, as shown, by way of example, in FIG. 11. In this histogram, the abscissa represents a distribution of luminance levels of all of the image pixels included in the reduced picture IG, and the ordinate represents a frequency or number of image pixels exhibiting a same luminance level. As stated above, the image pixels are sorted by the 256 luminance levels, which defines a full histogram-definition range from a zero luminance level to a 255 luminance level. Of course, as shown in FIG. 11, the minimum level (0) corresponds to black, and the maximum level (255) corresponds to white.

At step S206, a maximum peak $PK_1$ of the histogram is sought by suitably processing the histogram. Then, at step S208, a root luminance level of the maximum peak $PK_1$, which is at a low luminance side thereof, is set as a threshold $TH_1$. Namely, the threshold $TH_1$ is selected as a luminance level at which a frequency or number of pixels is abruptly increased in a band including the maximum peak $PK_1$.

At step S210, the image pixels included in the reduced picture IG are subjected to binarization with the threshold $TH_1$. The binarization of the image pixels with the threshold $TH_1$ is performed, using the variable $IG_s(s, t)$. For the binarization of the image pixels with the threshold $TH_1$, a s'×t' matrix area, corresponding to the aforesaid s×t matrix area, is defined in the working memory 56. Each element of the s'×t' matrix area is represented by one bit, and is represented by a variable BIN (s', t'). In the binarization, when each of the image pixels, represented by the variable $IG_s(s, t)$, exhibits a luminance level more than the threshold $TH_1$, a setting of "1" is given to a corresponding bit-element (pixel) represented by the variable BIN (s', t'). On the other hand, when each of the image pixels, represented by the variable $IG_s(s, t)$, exhibits a luminance level equal to or less than the threshold $TH_1$, a setting of "0" is given to a corresponding bit-element (pixel) represented by the variable BIN (s', t').

At step S212, in the s' ×t' matrix area, the bit-elements (pixels) having "0" are subjected to labeling. Namely, a 0-bit area, in which bit-elements having "0" are consecutively and continuously arranged, is extracted from the s'×t' matrix area. Of course, usually, plural 0-bit areas are extracted from the s'×t' matrix area, and there may be a 0-bit area, corresponding to the image (black) of the target 20, among the extracted 0-bit areas. Also, in the labeling, a number of bits included in each 0-bit area is counted.

At step S214, small 0-bit areas, each of which is composed of a number of bits less than a predetermined number, i.e. each of which does not correspond to the image of the target 20, is eliminated from among the extracted 0-bit areas. Of course, at this time, very small 0-bit areas (or noise areas) each of which is composed of either one bit or several bits, are eliminated from among the extracted 0-bit areas. The remaining 0-bit areas are nominated as 0-bit areas, each of which may correspond to the image of the target image 20.

At step S216, it is determined whether all the nominated 0-bit areas are processed at steps S218, S220 and S222. Namely, the processings of all the nominated 0-bit areas are successively performed. Of course, when the processings of all the nominated 0-bit areas are completed, the control returns to the camera-parameter-determination routine.

At step S218, a maximum $X_{as}$-coordinate, a maximum $Y_{as}$-coordinate, a minimum $X_{as}$-coordinate and a minimum $Y_{as}$-coordinate are read from each of the nominated 0-bit areas based on the two-dimensional coordinate system ($X_{as}$-$Y_{as}$), which is defined with respect to the reduced picture IG.

For example, when one of the nominated 0-bit areas corresponds to the image of the target 20, which is illustrated as a black-solid image in the reduced picture IG shown in FIG. 10, a maximum $X_{as}$-coordinate $x_{asmax}$, a maximum $Y_{as}$-coordinate $y_{asmax}$, a minimum $X_{as}$-coordinate $x_{asmin}$ and a minimum $Y_{as}$-coordinate $y_{asmin}$ are read from the 0-bit area or black-solid image. Of course, a rectangle, which is defined by both the maximum coordinates ($x_{asmax}$, $y_{asmax}$) and the minimum coordinates ($x_{asmin}$, $y_{asmin}$), is circumscribed about the black-solid image corresponding to the image of the target 20.

At step S220, the respective maximum $X_{as}$-coordinate, maximum $Y_{as}$-coordinate, minimum $X_{as}$-coordinate, and minimum $Y_{as}$-coordinate, based on the two-dimensional coordinate system ($X_{as}$-$Y_{as}$), are converted into a maximum $X_a$-coordinate, a maximum $Y_a$-coordinate, a minimum $X_a$-coordinate and a minimum $Y_a$-coordinate based on the picture coordinate system ($X_a$-$Y_a$) of the picture IM1. Namely, for example, the maximum $X_{as}$-coordinate $x_{asmax}$, maximum $Y_{as}$-coordinate $y_{asmax}$, minimum $X_{as}$-coordinate $x_{asmin}$, and minimum $Y_{as}$-coordinate $y_{asmin}$, derived from the black-solid image corresponding to the image of the target 20, are multiplied by the constant m as follows:

$$x_{amax} \leftarrow m \times x_{asmax}$$

$$y_{amax} \leftarrow m \times y_{asmax}$$

$$x_{amin} \leftarrow m \times x_{asmin}$$

$$y_{amin} \leftarrow m \times y_{asmin}$$

Thus, the respective maximum coordinates ($x_{asmax}$, $y_{asmax}$) and minimum coordinates ($x_{asmin}$, $y_{asmin}$), based on the two-dimensional coordinate system ($X_{as}$-$Y_{as}$) of the reduced picture IG, are converted into the maximum coordinates ($x_{amax}$, $y_{amax}$) and minimum coordinates ($x_{amin}$, $y_{amin}$), based on the picture coordinate system ($X_a$-$Y_a$) of the picture IM1.

Of course, as shown in FIG. 10, a rectangle GK is defined on the picture IM1 by the converted maximum coordinates ($x_{amax}$, $y_{amax}$) and minimum coordinates ($x_{amin}$, $y_{amin}$), and is substantially circumscribed about a target image illustrated as a back-solid image in the picture IM1 of FIG. 10.

At step S222, the converted maximum coordinates and converted minimum coordinates are stored or recorded in a given area of the working memory 56. Of course, when the execution of this subroutine is completed, the maximum coordinates ($x_{amax}$, $y_{amax}$) and minimum coordinates ($x_{amin}$, $y_{amin}$), associated with the target image, are stored or recorded in the given area of the working memory 56.

Figure 12:
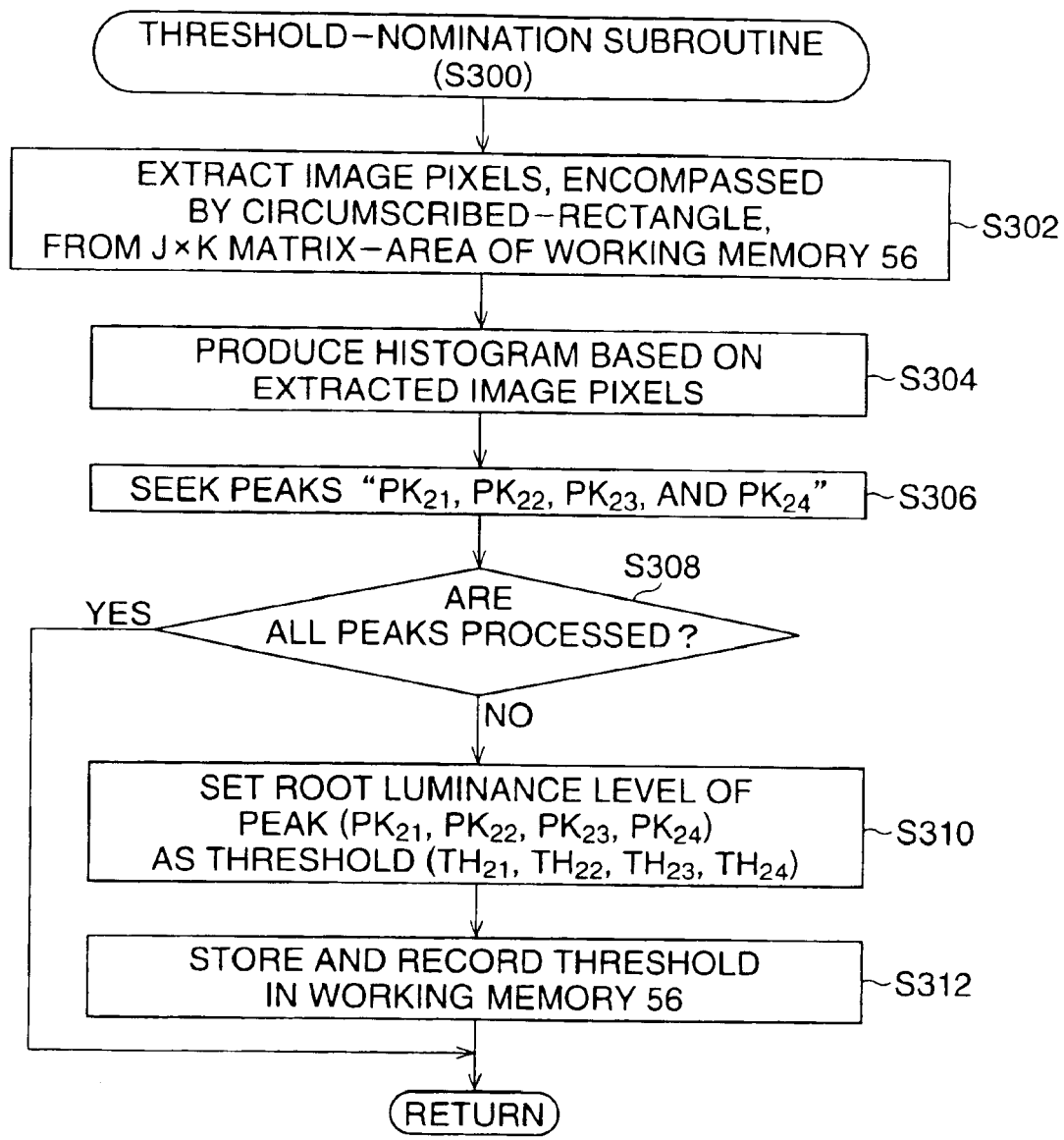
FIG. 12 is a flowchart of a threshold-nomination subroutine executed in step S300 of the camera-parameter-determination routine of FIG. 8.

FIG. 12 shows a flowchart of the threshold-nomination subroutine executed in step S300 of the camera-parameter-determination routine shown in FIG. 8.

At step S302, all image pixels, encompassed by one of the nominated circumscribed-rectangles, are extracted from the J×K matrix-area of the working memory 56, using the variable $IM_g(j, k)$. For example, when the image pixels, encompassed by the circumscribed-rectangle GK including the target image, are extracted, the extraction of the image pixels from the circumscribed-rectangle GK is performed based on the maximum coordinates ($x_{amax}$, $y_{amax}$) and the minimum coordinates ($x_{amin}$, $y_{amin}$), which define the circumscribed-rectangle GK.

Figure 13:
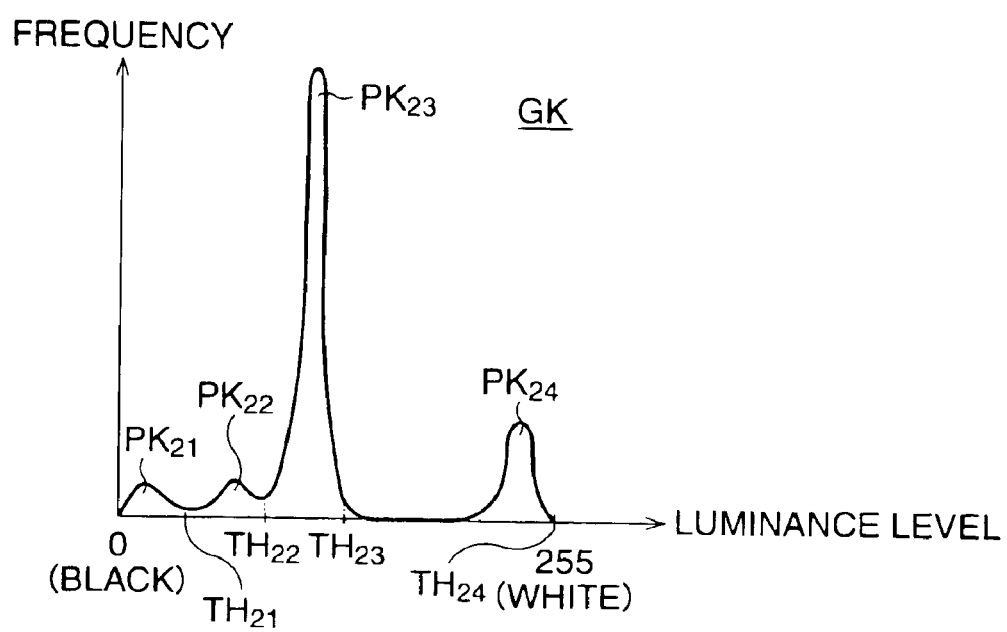
FIG. 13 is a histogram based on image pixels encompassed by the circumscribed-rectangle defined on the first picture of FIG. 10.

At step S304, a histogram is produced based on the extracted image pixels, as shown, by way of example, in FIG. 13. Then, at step S306, peaks $PK_{21}$, $PK_{22}$, $PK_{23}$ and $PK_{24}$ of the histogram are sought by suitably processing the histogram.

Note, similar to FIG. 11, in the histogram of FIG. 13, the abscissa represents a distribution of luminance levels of all of the image pixels included in the circumscribed-rectangle concerned, and the ordinate represents a frequency or number of image pixels exhibiting a same luminance level. Also, the image pixels are sorted by the 256 luminance levels, which defines a full histogram-definition range from a zero luminance level to a 255 luminance level. Further, as shown in FIG. 13, the minimum level (0) corresponds to black, and the maximum level (255) corresponds to white.

At step S308, it is determined whether all the peaks $PK_{21}$, $PK_{22}$, $PK_{23}$ and $PK_{24}$, are processed at steps S310 and S312. Namely, the processings of all the peaks $PK_{21}$, $PK_{22}$, $PK_{23}$ and $PK_{24}$ are successively performed one by one, and it is confirmed whether the processings of all the peaks $PK_{21}$, $PK_{22}$, $PK_{23}$ and $PK_{24}$ has been completed. Of course, when the processings of all the peaks $PK_{21}$, $PK_{22}$, $PK_{23}$ and $PK_{24}$ are completed, the control returns to the camera-parameter-determination routine.

Note, if it is determined that the histogram includes no peak (S306), it is regarded that the processings of the peaks has been completed, whereby the control immediately returns from step S308 to the camera-parameter-determination routine.

At step S310, a root luminance level of each peak ($PK_{21}$, $PK_{22}$, $PK_{23}$, $PK_{24}$), which is at a high luminance side thereof, is set as a threshold ($TH_{21}$, $TH_{22}$, $TH_{23}$, $TH_{24}$). Namely, the threshold ($TH_{21}$, $TH_{22}$, $TH_{23}$, $TH_{24}$) is selected as a luminance level at which a variation of the frequency or number of pixels is small.

At step S312, the set threshold ($TH_{21}$, $TH_{22}$, $TH_{23}$, $TH_{24}$) is stored and recorded in a given area of the working memory 56.

Figure 14:
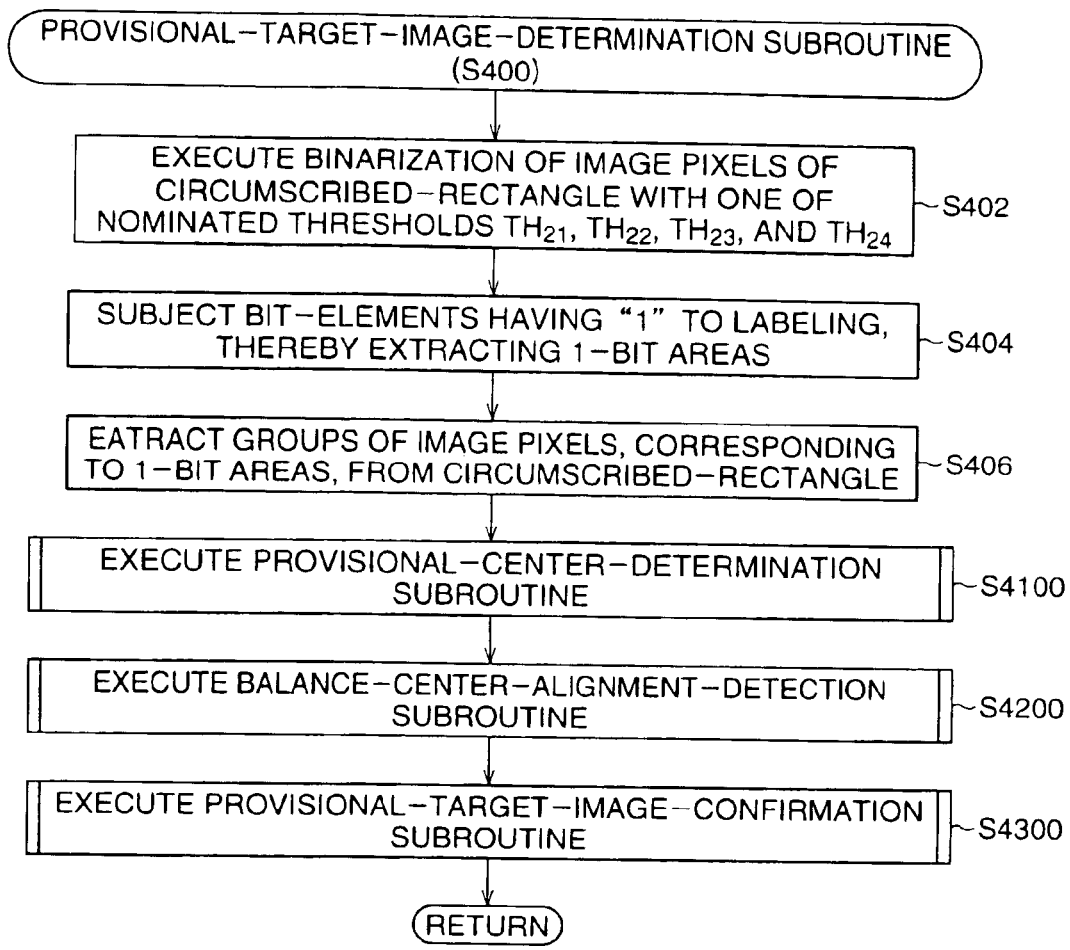
FIG. 14 is a flowchart of a provisional-target-image-determination subroutine executed in step S400 of the camera-parameter-determination routine of FIG. 8.

FIG. 14 shows a flowchart of the provisional-target-image-determination subroutine executed in step S400 of the camera-parameter-determination routine shown in FIG. 8.

At step S402, the image pixels, encompassed by the circumscribed-rectangle concerned, are subjected to binarization with one of the nominated thresholds $TH_{21}$, $TH_{22}$, $TH_{23}$ and $TH_{24}$. For the binarization, a matrix area, corresponding to the circumscribed-rectangle concerned, is defined in the working memory 56, and each element of the matrix area is represented by one bit. In the binarization, when each of the image pixels exhibits a luminance level equal to or more than the threshold ($TH_{21}$, $TH_{22}$, $TH_{23}$, $TH_{24}$), a setting of "1" is given to a corresponding bit-element (pixel) of the matrix area. On the other hand, when each of the image pixels exhibits a luminance level less than the threshold ($TH_{21}$, $TH_{22}$, $TH_{23}$, $TH_{24}$) a setting of "0" is given to a corresponding bit-element (pixel) of the matrix area.

Note, for example, the binarization of the image pixels, encompassed by the circumscribed-rectangle GK (FIG. 10) is performed, using the variable $IM_g(j, k)$, based on the maximum coordinates ($x_{amax}$, $y_{amax}$) and the minimum coordinates ($x_{amin}$, $y_{amin}$) which define the circumscribed-rectangle GK.

At step S404, in the matrix area, the bit-elements (pixels) having "1" is subjected to a labeling. Namely, an 1-bit area, in which bit-elements having "1" are consecutively and continuously arranged, is extracted from the matrix area.

Note, of course, when the bit-elements of the matrix area, corresponding to the circumscribed-rectangle GK including the target image, are subjected to the labeling, at least six 1-bit areas, representing the reference points 22P, 24P, 26P, 32P, 34P and 36P of the target 20, may be extracted from the matrix area.

At step S406, respective groups of image pixels, corresponding to the extracted 1-bit areas, are extracted from the circumscribed-rectangle concerned, and are then stored and recorded in a given area of the working memory 56.

At step S4100, a provisional-balance-center-determination subroutine is executed, whereby a center of balance of each of the extracted 1-bit areas is provisionally determined as a set of coordinates based on the picture coordinate system ($X_a$-$Y_a$), by suitably processing a corresponding group of image pixels, each of which is represented by the variable $IM_g(j, k)$. Of course, when the groups of image pixels are included in the circumscribed-rectangle GK, the set of determined coordinates may represent one of the reference points 22P, 24P, 26P, 32P, 34P and 36P of the target 20. Note, the provisional-balance-center-determination subroutine is explained in detail hereinafter with reference to FIG. 15.

At step S4200, a balance-center-alignment-detection subroutine is executed, whereby an alignment of three balance-centers and an alignment of four balance-centers are detected from among the balance-centers included in the circumscribed-rectangle concerned. Of course, when the balance-centers, determined by the execution of the provisional-balance-center-determination subroutine, are included in the circumscribed-rectangle GK, the alignment of three balance-centers may correspond to one of three alignments of the reference points 22P, 32P and 34P; 32P, 34P and 24P; and 24P, 36P and 26P, and the alignment of four balance-centers may correspond to an alignment of the reference points 22P, 32P, 34P and 24P (FIG. 4). Note, the balance-center-alignment-detection subroutine is explained in detail hereinafter with reference to FIG. 16.

At step S4300, a provisional-target-image-confirmation subroutine is executed to provisionally confirm whether the image of the target 20 is included in the circumscribed-rectangle concerned, by suitably processing the alignments of three balance-centers and the alignments of four balance-centers obtained by the execution of the balance-center-alignment-detection subroutine.

Figure 15:
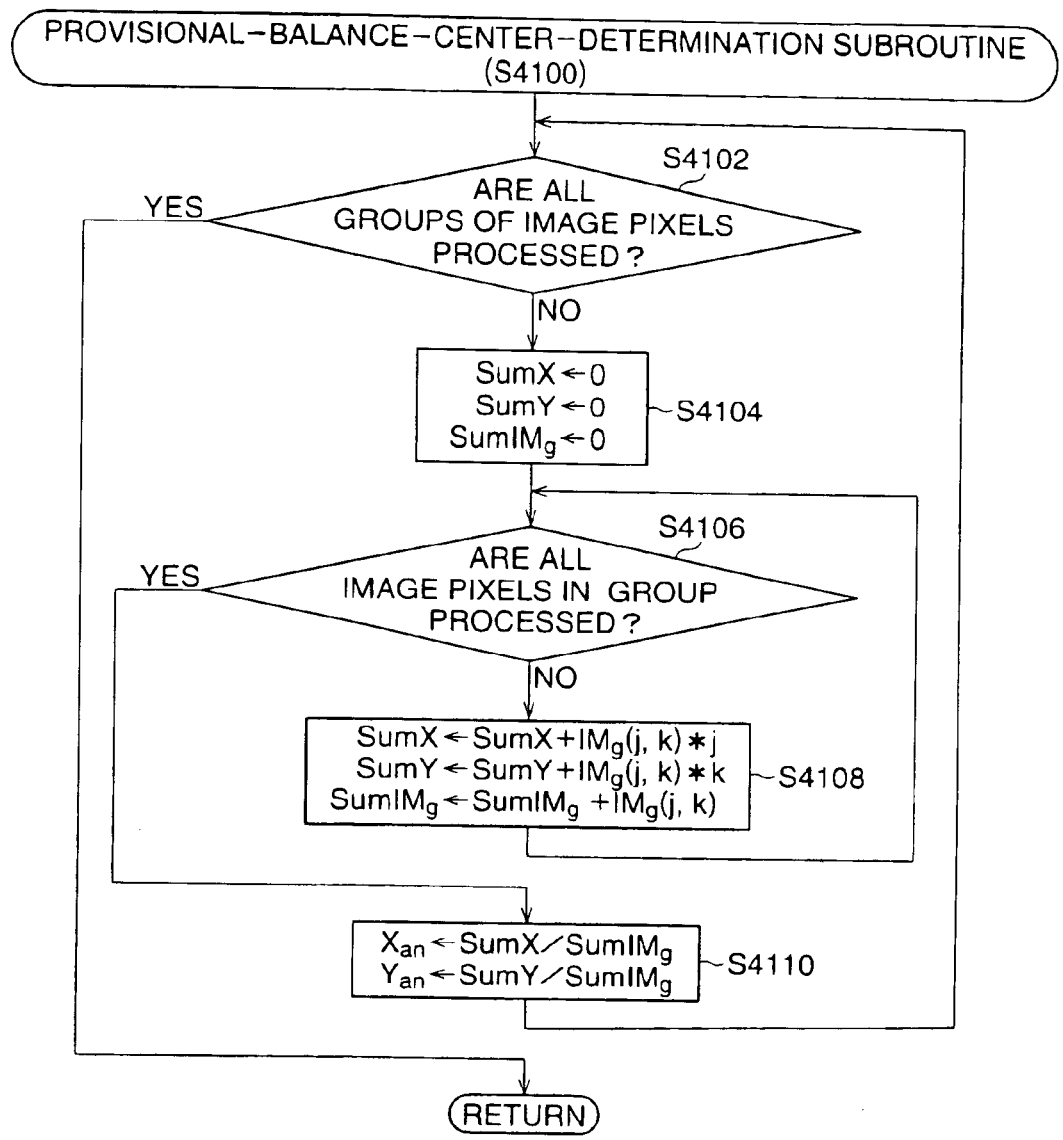
FIG. 15 is a flowchart of a provisional-balance-center-determination subroutine executed in step S4100 of the provisional-target-image-determination subroutine of FIG. 14.

FIG. 15 shows a flowchart of the provisional-balance-center-determination subroutine executed in step S4100 of the provisional-target-image-determination subroutine of FIG. 14.

At step S4102, it is determined whether all the groups of image pixels, corresponding to the extracted 1-bit areas, are processed for the provisional determination of a center of balance of each of the extracted 1-bit areas. Of course, when the processings of all the groups of image pixels are completed, the control returns from step S4102 to the target-image-determination subroutine of FIG. 14. Note, if there is no 1-bit area to be executed from the aforesaid matrix area (step S404 of FIG. 14), i.e. if there is no group of image pixels to be processed, the control immediately returns from step S4102 to the provisional-target-image-determination subroutine of FIG. 14.

At step S4104, each of variables SumX, SumY and $SumIM_g$ are initialized to "0". Then, at step S4106, it is determined whether all the image pixels included in the group concerned are processed at step S4108.

At step S4108, the following calculations are executed with respect to all the image pixels included in the group concerned:

$$SumX \leftarrow SumX + IM_g(j, k) \times j$$

$$SumY \leftarrow SumY + IM_g(j, k) \times k$$

$$SumIM_g \leftarrow SumIM_g + IM_g(j, k)$$

Namely, a luminance level of each image pixel is multiplied by an $X_a$-coordinate "j" thereof, and the variable SumX is ultimately defined as a total of the multiplied luminance levels. Similarly, a luminance level of each image pixel is multiplied by a $Y_a$-coordinate "k" thereof, and the variable SumY is ultimately defined as a total of the multiplied luminance levels. Also, the variable $SumIM_g$ is ultimately defined as a total of luminance levels of all the image pixel included in the group concerned.

At step S4106, when it is confirmed that the execution of the aforesaid calculations is completed with respect to all the image pixels, included in the group concerned, the control proceeds from step S4106 to step S4110, in which a set of coordinates ($x_{an}$, $y_{an}$), provisionally representing the center of balance of the extracted 1-bit area corresponding to the group concerned, is calculated as follows:

$$x_{an} \leftarrow SumX/SumIM_g$$

$$y_{an} \leftarrow SumY/SumIM_g$$

The set of calculated center-coordinates ($x_{an}$, $y_{an}$) is stored and recorded in a given area of the working memory 56. Of course, when a number of the extracted 1-bit areas or groups of image pixels is N, N sets of center-coordinates ($x_{an}$, $y_{an}$) (n=1, 2, ... N) can be obtained by the execution of the provisional-balance-center-determination subroutine.

Figure 16:
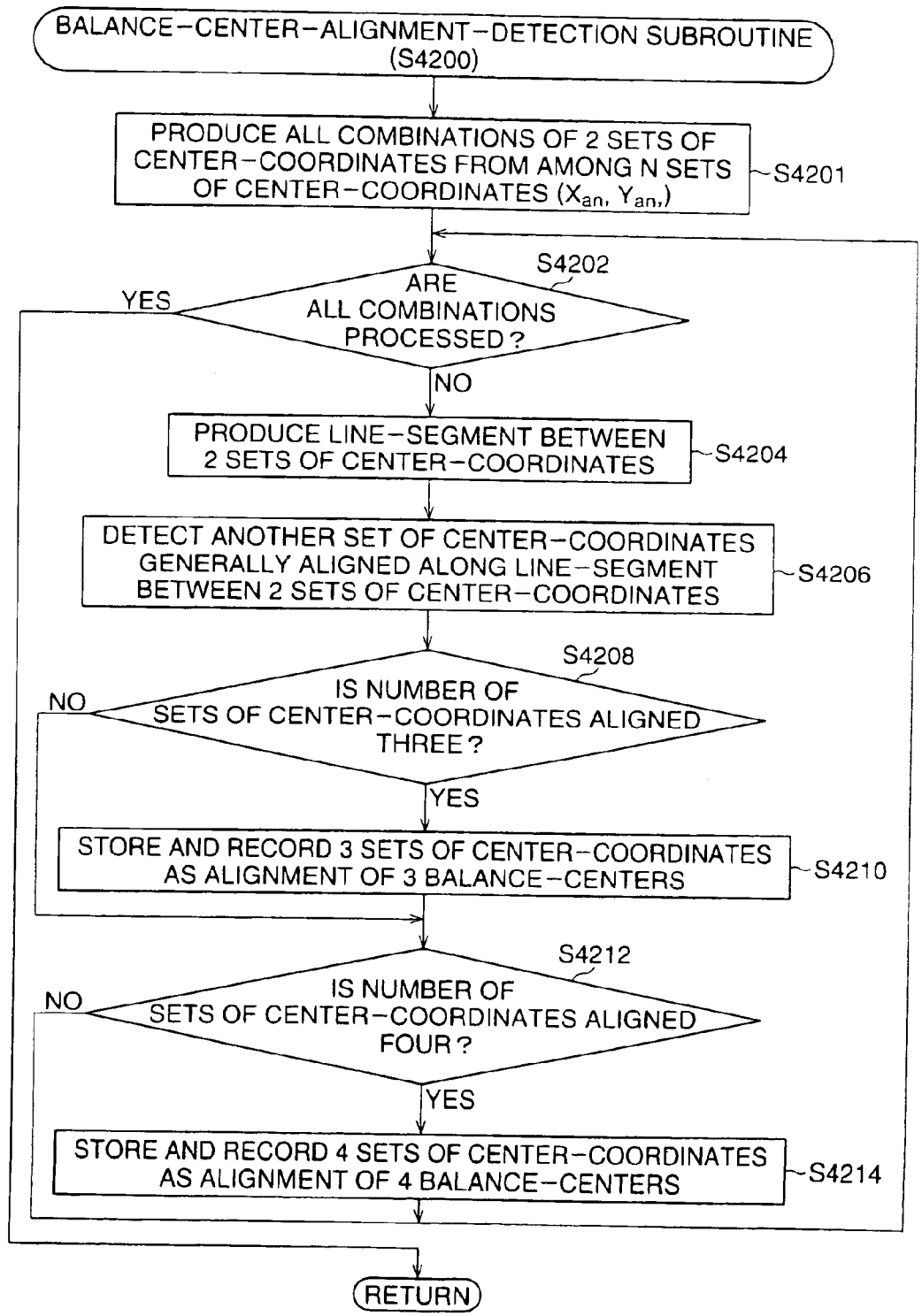
FIG. 16 is a flowchart of a balance-center-alignment-detection subroutine executed in step S4200 of the provisional-target-image-determination subroutine of FIG. 14.

FIG. 16 shows a flowchart of the balance-center-alignment-detection subroutine executed in step S4200 of the provisional-target-image-determination subroutine of FIG. 14.

At step S4201, all combinations of two sets of balance-center-coordinates are produced from among the N sets of balance-center-coordinates ($x_{an}$, $y_{an}$). Then, at step S4202, it is determined whether all the combinations of two sets of balance-center-coordinates are processed at steps S4204, S4206, S4208, S4210, S4212 and step S4214. When the processings of all combinations of two sets of balance-center-coordinates are completed, the control returns from step S4202 to the provisional-target-image-determination subroutine of FIG. 14.

At step S4204, a line-segment is produced between two sets of balance-center-coordinates. Then, at step S4206, another set of balance-center coordinates, generally aligned along the line-segment between the aforesaid two sets of balance-center-coordinates, is detected. In other words, the detection of the set of balance-center coordinates is performed with a predetermined tolerance.

At step S4208, it is determined whether a number of sets of balance-center-coordinates, generally aligned with each other along the line-segment is, three or not. If the number is three, the control proceeds to step S4210, in which the three sets of balance-center-coordinates are stored and recorded as an alignment of three balance-centers in a given area of the working memory 56.

On the other hand, at step S4208, if the number is not three, the control skips step S4212, in which it is determined whether the number of sets of balance-center-coordinates, aligned with each other along the line-segment, is four or not. If the number is four, the control proceeds to step S4214, in which the four sets of balance-center-coordinates are stored and recorded as an alignment of four balance-centers in a given area of the working memory 56.

Thereafter, the control returns to step S4202. Also, at step S4212, if the number is not four, the control returns to step S4202. Namely, the routine comprising steps S4202, S4206, S4208, S4210, S4212 and S4214 is repeated until the processings of all combinations of two sets of balance-center-coordinates are completed.

Note, when all the sets of balance-center-coordinates are included in the circumscribed-rectangle GK (FIG. 10), at least three alignment of three balance-centers, corresponding to respective alignments of the reference points 22P, 32P and 34P; 32P, 34P and 24P; and 24P, 36P and 26P, may be obtained, and at least one alignment of four balance-centers, corresponding to an alignment of the reference points 22P, 32P, 34P and 24P, may be obtained.

Figure 17:
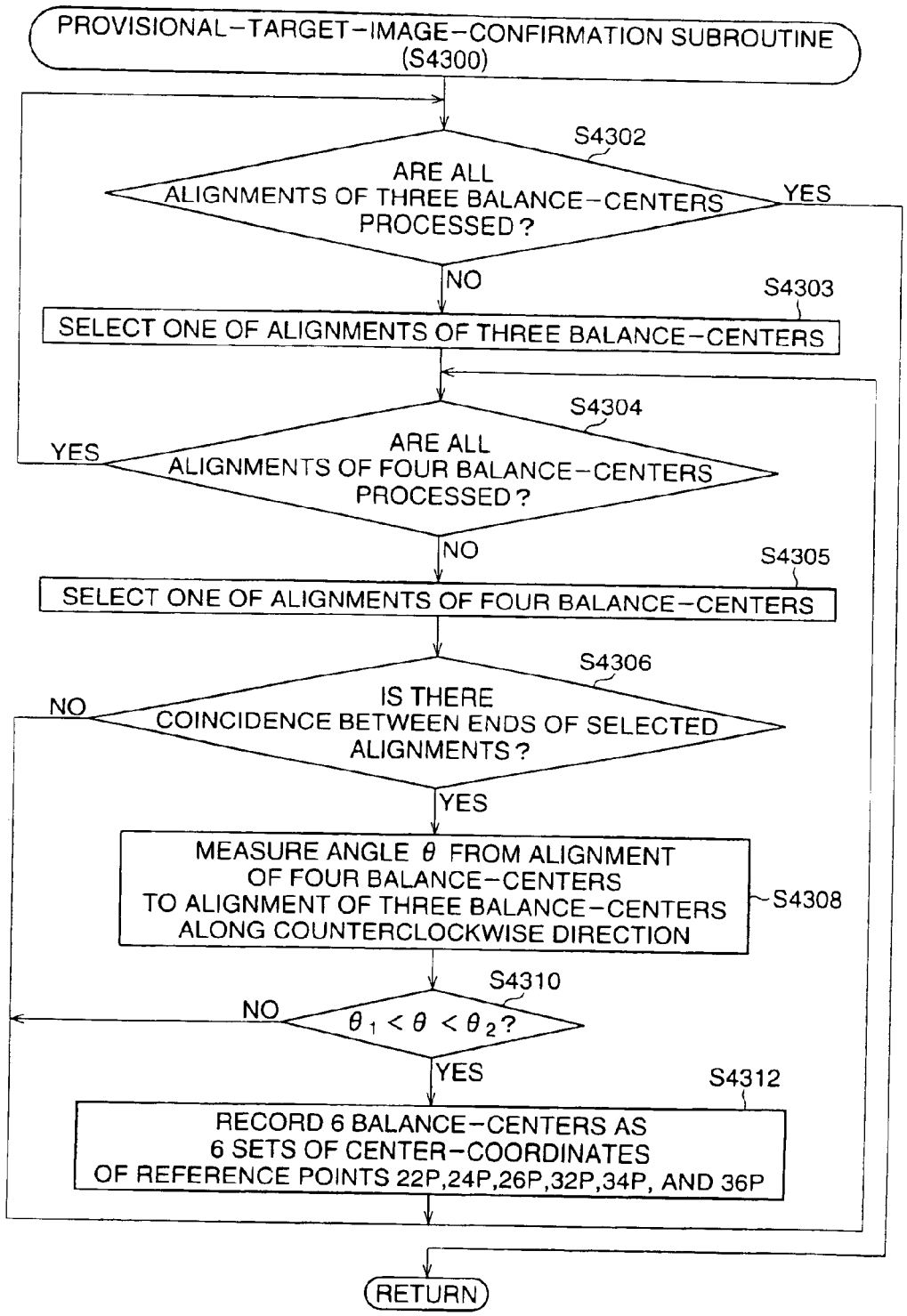
FIG. 17 is a flowchart of a provisional-target-image-confirmation subroutine executed in step S4300 of the provisional-target-image-determination subroutine of FIG. 14.

FIG. 17 shows a flowchart of the provisional-target-image-confirmation subroutine executed in step S4300 of the provisional-target-image-determination subroutine of FIG. 14.

At step S4302, it is determined whether all the alignments of three balance-centers are processed. If the processings of all the alignments of three balance-centers is not completed, i.e. if an alignment of three balance-centers to be processed remains, the control proceeds to step S4303, in which the alignment of three balance-centers to be processed is selected. Note, if the processings of all the alignments of three balance-centers are completed, i.e. if there is no alignment of three balance-centers to be processed, the control returns from step 4302 to the provisional-target-image-determination subroutine of FIG. 14.

At step S4304, it is determined whether all the alignments of four balance-centers have been processed. If the processings of all the alignments of four balance-centers are not completed, i.e. if an alignment of four balance-centers to be processed remains, the control proceeds to step S4305, in which the alignment of four balance-centers to be processed is selected. Note, if the processings of all the alignments of four balance-centers are completed, i.e. if there is no alignment of four balance-centers to be processed, the control returns from step S4304 to step S4302.

At step S4306, it is determined whether an endmost balance-center of the selected alignment of three balance-centers and an endmost balance-center of the selected alignment of four balance-centers coincides with each other. If there is no coincidence, the control returns to step S4304.

At step S4306, if there is a coincidence between the endmost balance-center of the selected alignment of three balance-centers and the endmost balance-center of the selected alignment of four balance-centers, the control proceeds to step S4308, in which an angle θ is measured from the alignment of four balance-centers to the alignment of three balance-centers along the counterclockwise direction.

At step S4310, it is determined whether the measured angle θ falls in a range between angles $θ_1$ and $θ_2$. The angle $θ_1$ may be set to be 0°, and the angle $θ_2$ may be set to be 180°, because the right corner angle of the target 20 is photographed and recorded as an angle between 0° and 180°.

If the measured angle θ falls in the range between the angles $θ_1$ and $θ_2$, it is provisionally confirmed that the circumscribed-rectangle concerned includes the image of the target 20. Thus, the control proceeds from step S4310 to step S4312, in which the respective six balance-centers, included in both the selected alignments, are stored and recorded in a given area of the working memory 56 as six sets of center-coordinates corresponding to the reference points 22P, 24P, 26P, 32P, 34P and 36P based on the picture coordinate system ($X_a$-$Y_a$). On the other hand, if the measured angle θ does not fall in the range between the angles $θ_1$ and $θ_2$, the control returns to step S4304.

Of course, according to circumstances, there may be a case where the circumscribed-rectangle concerned may include two or more images, each of which may be presumed as the image of the target 20. In this case, two or more groups of respective six sets of center-coordinates corresponding to the reference points 22P, 24P, 26P, 32P, 34P and 36P are provisionally determined by the execution of the provisional-target-image-confirmation subroutine of FIG. 17, and respective six sets of center-coordinates, included in each group, are represented by variables $va_1(x_{a1}, y_{a1})$, $va_2(x_{a2}, y_{a2})$, $va_3(x_{a3}, y_{a3})$, $va_4(x_{a4}, y_{a4})$, $va_5(x_{a5}, y_{a5})$ and $va_6(x_{a6}, y_{a6})$ based on the picture coordinate system ($X_a$-$Y_a$).

Figure 18:
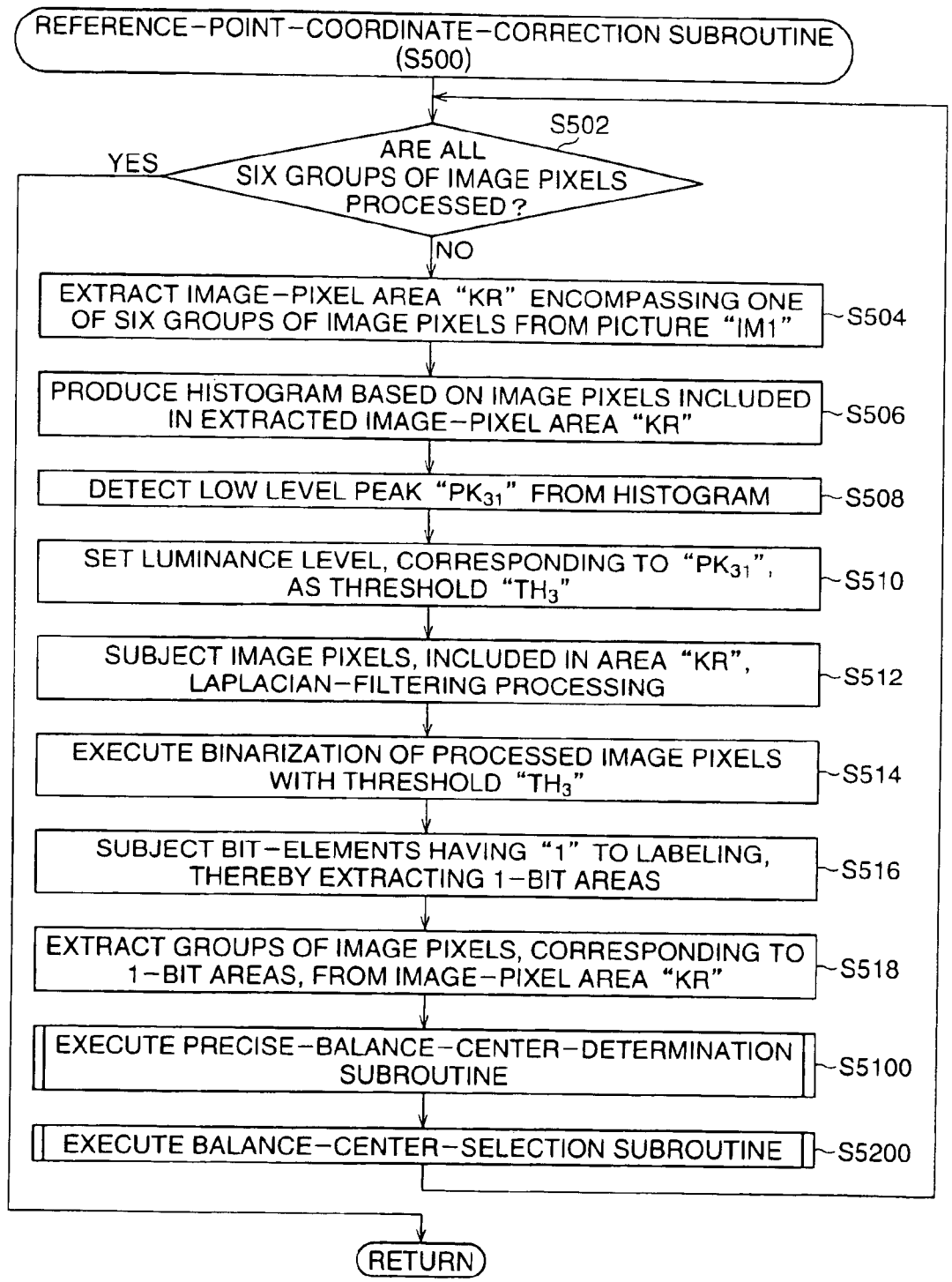
FIG. 18 is a flowchart of a reference-point-coordinate-correction subroutine executed in step S500 of the camera-parameter-determination routine of FIG. 8.

FIG. 18 shows a flowchart of the reference-point-coordinate-correction subroutine executed in step S500 of the camera-parameter-determination routine shown in FIG. 8.

At step 502, it is determined whether all the six groups of image pixels, from which the six sets of center-coordinates are derived, respectively, are processed. If the processings of the six groups of image pixels are completed, the control returns from step S502 to the camera-parameter-determination routine shown in FIG. 8.

At step 504, an image-pixel area, encompassing one of the six groups of image pixel, is extracted from the picture IM1. In this embodiment, the extracted image-pixel area may correspond to a 13×10 matrix area, as shown, by way of example, in FIG. 19, the image-pixel area being indicated by reference KR. An extent of the image-pixel area is suitably selected as an area which surrounds each of the reference points 22P, 24P, 26P, 32P, 34P and 36P, but is smaller than a photographed image of a corresponding circular plate-like element (22, 24, 26, 32, 34, 36) of the target 20.

In the image-pixel area KR, each of the image pixels is shown as a small square. An open square represents an image pixel with a white level, and a hatched square represents an image pixel with a gray level. The narrower a hatching pitch of the hatched square, the higher the gray level of the image pixel represented by the hatched square. Note, as already stated above, the image pixels are sorted by 256 luminance levels, and each image pixel is represented by the variable $IM_g(j, k)$.

Figure 20:
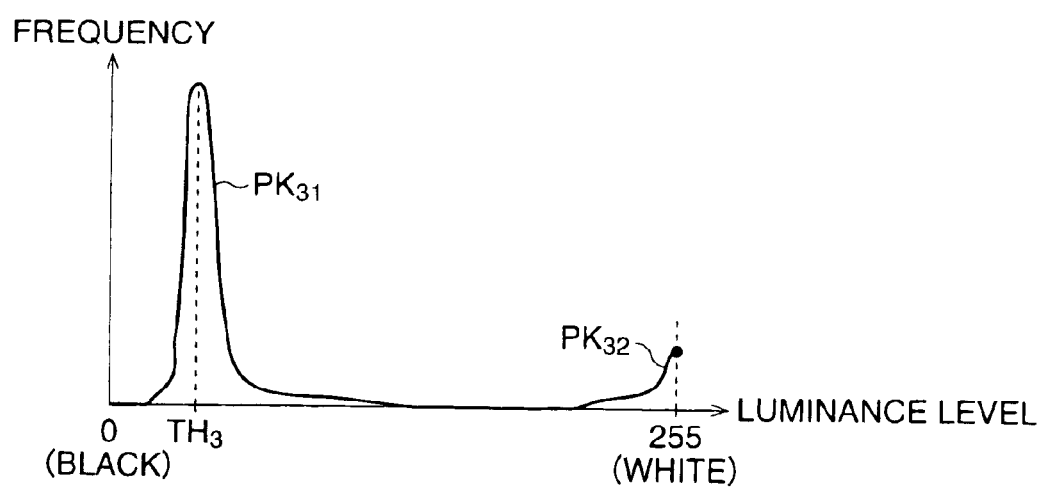
FIG. 20 is a histogram based on image pixels included in the image-pixel area shown in FIG. 19.

At step S506, a histogram is produced based on the image pixels included in the extracted image-pixel area KR, using the variable $IM_g(j, k)$, as shown, by way of example, in FIG. 20. Of course, in this histogram, the abscissa represents a distribution of luminance levels of the image pixels included in the image-pixel area KR, and the ordinate represents a frequency or number of image pixels exhibiting a same luminance level. Also, a minimum level (0) corresponds to black, and a maximum level (255) corresponds to white.

As is apparent from FIG. 20, the produced histogram features a low luminance level peak $PK_{31}$ and a high luminance level peak $PK_{32}$, because the image-pixel area is selected as the area which surrounds each of the reference points 22P, 24P, 26P, 32P, 34P and 36P, but is smaller than the photographed image of the corresponding circular plate-like element (22, 24, 26, 32, 34, 36) of the target 20.

At step S508, the low luminance level peak $PK_{31}$ is detected from the histogram as shown in FIG. 20. Then, at step S510, a luminance level, corresponding to the low luminance level peak $PK_{31}$, is set as a threshold $TH_3$.

Figures 21, 22:
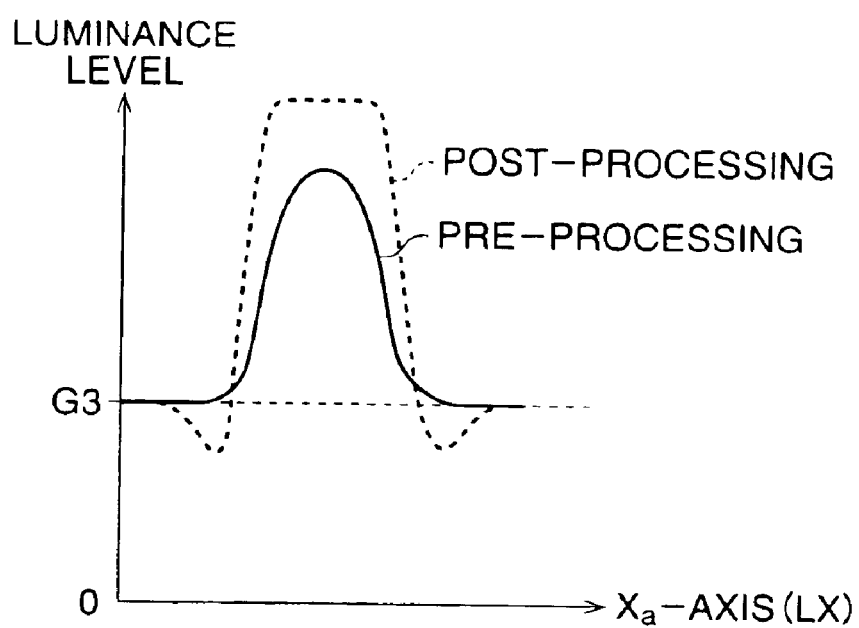
FIG. 21 is a conceptual view showing an 8-neighbor Laplacian filter used in the Laplacian-filtering processing.
FIG. 22 is a graph for explaining the Laplacian-filtering processing.

At step S512, the image pixels, included in the image-pixel area KR, are subjected to the Laplacian-filtering processing, using, for example, an 8-neighbor Laplacian filter as conceptually shown in FIG. 21. Namely, in the image-pixel area KR, each of the image pixels, represented by the variable $IM_g(j, k)$, is converted into a variable $KR(j, k)$, using the following formula:

$$KR(j, k) = 9 \times IM_g(j, k) + (-1) \times [IM_g(j-1, k+1) +$$

$$IM_g(j, k+1) + IM_g(j+1, k+1) +$$

$$IM_g(j-1, k) + IM_g(j+1, k) +$$

$$IM_g(j-1, k-1) + IM_g(j, k-1) +$$

$$IM_g(j+1, k-1)]$$

By the Laplacian-filtering processing, the image of the image-pixel area KR is sharpened, as conceptually shown in a graph of FIG. 22. In this graph, there is shown a variation in the luminance level along a line, indicated by an arrow LX in FIG. 19. Namely, a solid curve represents the variation in the luminance level when the image pixels is not subjected to the Laplacian-filtering processing, and a broken curve represents the variation in the luminance level after the image pixels are subjected to the Laplacian-filtering processing. Of course, due to Laplacian-filtering processing, not only can the image of the image-pixel area KR be sharpened, but noise can also be eliminated from the image-pixel area KR.

At step S514, the processed image pixels of the image-pixel area KR are subjected to binarization with the threshold $TH_3$. For the binarization, a matrix area, corresponding to the image-pixel area KR, is defined in the working memory 56, and each element of the matrix area is represented by one bit. In the binarization, when each of the image pixels exhibits a luminance level equal to or more than the threshold $TR_3$, a setting of "1" is given to the corresponding bit-element (pixel) of thematrix area. On the other hand, when each of the image pixels exhibits a luminance level less than the threshold $TH_3$, a setting of "0" is given to the corresponding bit-element (pixel) of the matrix area.

At step S516, in the matrix area, the bit-elements (pixels) having "1" is subjected to labeling. Namely, an 1-bit area, in which bit-elements having "1" are consecutively and continuously arranged, is extracted from the matrix area.

Of course, when the bit-elements of the matrix area, corresponding to the image-pixel area KR, are subjected to the labeling, an 1-bit area, representing a corresponding reference point (22P, 24P, 26P, 32P, 34P, 36P) of the target 20, is extracted from the matrix area. Nevertheless, another 1-bit area may be extracted as noise from the matrix area. For example, when a whitish scrap has adhered to the corresponding circular plate-like element (22, 24, 26, 32, 34, 36) of the target 20, an area corresponding to the whitish scrap may be extracted as the 1-bit area from the matrix area.

At step S518, respective groups of image pixels, corresponding to the extracted 1-bit areas, are extracted from the image-pixel area, and are then stored or recorded in a given area of the working memory 56.

At step S5100, a precise-balance-center-determination subroutine is executed, to thereby precisely determine a center of balance of each of the extracted 1-bit areas as a set of coordinates based on the picture coordinate system ($X_a$-$Y_a$) by suitably processing a corresponding group of image pixels, each of which is represented by the variable $IM_g(j, k)$. Note, the precise-balance-center-determination subroutine is explained in detail hereinafter with reference to FIG. 23.

At step S5200, a balance-center-selection subroutine is executed, whereby a most precise set of center-coordinate is selected from among plural sets of coordinates obtained during the execution of the precise-balance-center-determination subroutine, each set of coordinates being presumed as representing a center of balance of one of the extracted 1-bit areas. Note, the balance-center-selection subroutine is explained in detail hereinafter with reference to FIG. 24.

Figure 23:
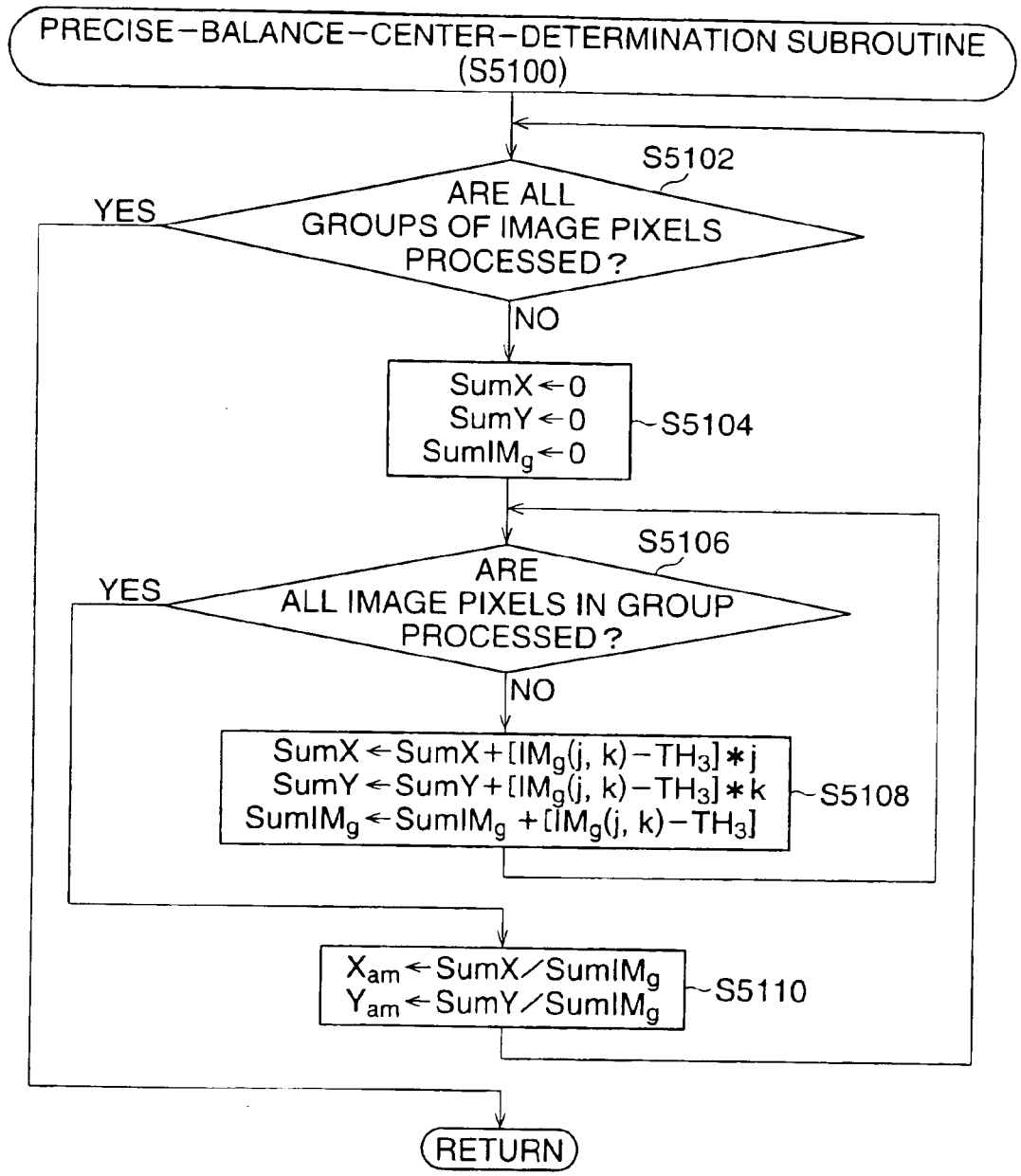
FIG. 23 is a flowchart of a precise-balance-center-determination subroutine executed in step S5100 of the reference-point-coordinate-correction subroutine of FIG. 18.

FIG. 23 shows a flowchart of the precise-balance-center-determination subroutine executed in step S5100 of the reference-point-coordinate-correction subroutine of FIG. 18.

At step S5102, it is determined whether all the groups of image pixels, corresponding to the extracted 1-bit areas, are processed for the precise determination of a center of balance of each of the extracted 1-bit areas. Of course, when the processings of all the groups of image pixels are completed, the control returns from step S5102 to the reference-point-coordinate-correction subroutine of FIG. 18. Note, if there is no 1-bit area to be executed from the aforesaid matrix area (step S516 of FIG. 18), i.e. if there is no group of image pixels to be processed, the control immediately returns from step S5102 to the reference-point-coordinate-correction subroutine of FIG. 18.

At step S5104, each of variables SumX, SumY and $SumIM_g$ are initialized to "0". Then, at step S5106, it is determined whether all the image pixels included in the group concerned are processed at step S5108.

At step S5108, the following calculations are executed with respect to all the image pixels included in the group concerned:

$$SumX \leftarrow SumX + [IM_g(j, k) - TH_3] \times j$$

$$SumY \leftarrow SumY + [IM_g(j, k) - TH_3] \times k$$

$$SumIM_g \leftarrow SumIM_g + [IM_g(j, k) - TH_3]$$

Namely, a subtraction of the threshold $TH_3$ from a luminance level of each image pixel is multiplied by an $X_a$-coordinate "j" thereof, and the variable SumX is ultimately defined as a total of the multiplied luminance levels. Similarly, a subtraction of the threshold $TH_3$ from a luminance level of each image pixel is multiplied by a $Y_a$-coordinate "k" thereof, and the variable SumY is ultimately defined as a total of the multiplied luminance levels. Also, the variable $SumIM_g$ is ultimately defined as a total of luminance levels of all the image pixels, from each of which the threshold $TH_3$ is subtracted.

At step S5106, when it is confirmed that the execution of the aforesaid calculations is completed with respect to all the image pixels, included in the group concerned, the control proceeds from step S5106 to step S5110, in which a set of center-coordinates ($x_{am}$, $y_{am}$), representing the center of balance of the extracted 1-bit area corresponding to the group concerned, is calculated as follows:

$$x_{am} \leftarrow SumX/SumIM_g$$

$$y_{am} \leftarrow SumY/SumIM_g$$

The set of calculated center-coordinates ($x_{am}$, $y_{am}$) is stored and recorded in a given area of the working memory 56. Of course, when a number of the extracted 1-bit areas or groups of image pixels is M, M sets of center-coordinates ($x_{am}$, $y_{am}$) (m=1, 2, ... M) can be obtained by the execution of the precise-balance-center-determination subroutine.

Note, although the calculations of the center-coordinates ($x_{am}$, $y_{am}$) is similar to the calculations of the provisional center-coordinates ($x_{an}$, $y_{an}$) performed in the provisionalbalance-center-determination subroutine of FIG. 15, it is possible to more precisely determine the center-coordinates ($x_{an}$, $y_{am}$) in comparison with the provisional center-coordinates ($x_{an}$, $y_{an}$), due to the subtraction of the threshold $TH_3$ from a luminance level of each image pixel (step S5108).

Figure 24:
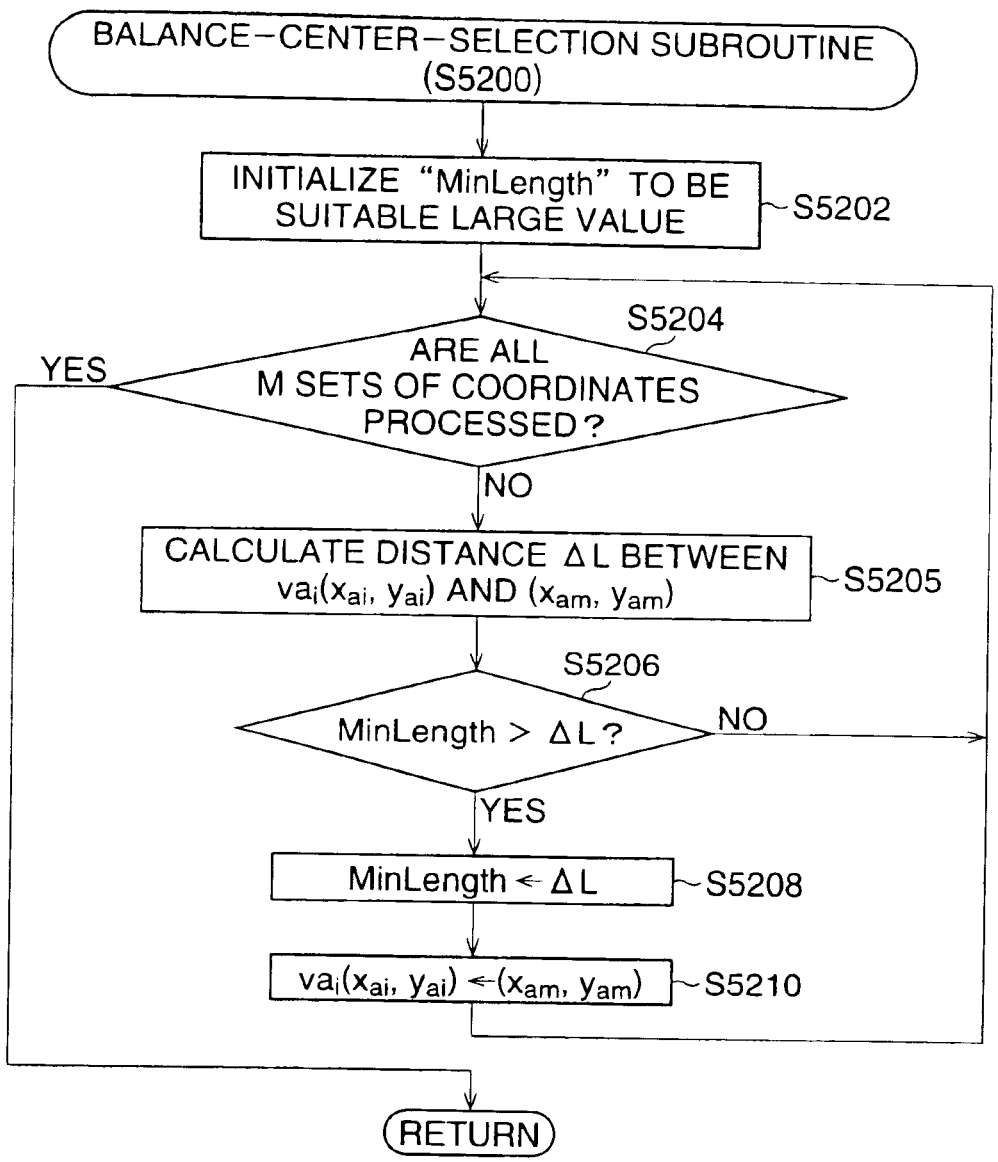
FIG. 24 is a flowchart of a balance-center-selection subroutine executed in step S5200 of the reference-point-coordinate-correction subroutine of FIG. 18.

FIG. 24 shows a flowchart of the balance-center-selection subroutine executed in step S5200 of the reference-point-coordinate-correction subroutine of FIG. 18.

Figure 19:
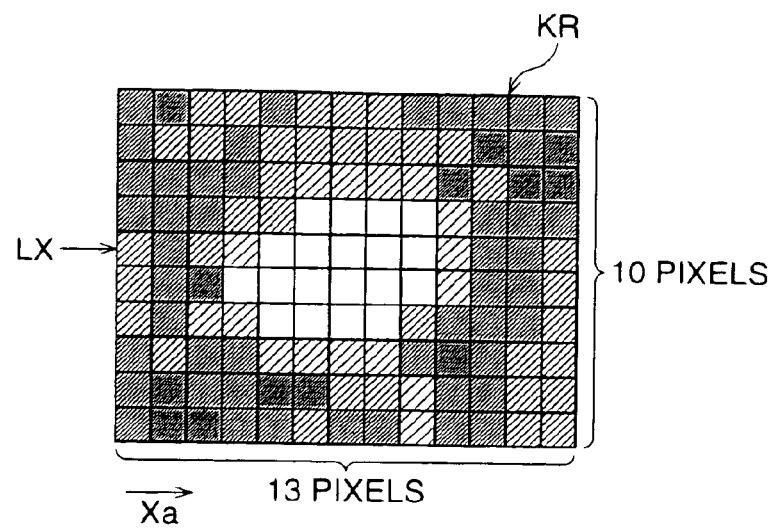
FIG. 19 is a conceptual view showing an image-pixel area extracted from the first picture so as to include an image of a reference point of the target.

At step S5202, a variable "MinLength" is initialized to be a suitable large value. For example, the variable MinLength may be initially set to be a distance corresponding to 13 image pixels arranged along the $X_a$-axis in the image-pixel area KR (FIG. 19).

At step S5204, it is determined whether all the M sets of center-coordinates ($x_{am}$, $y_{am}$) (m=1, 2, . . . M) are processed at steps S5205, S5206, S5208 and S5210. When it is confirmed that the processings of all the M sets center coordinates ($x_{am}$, $y_{am}$) are completed, the control returns from step S5204 to the reference-point-coordinate-correction subroutine of FIG. 18.

At step S5205, a distance ΔL between a set of coordinates $va_i(x_{ai}, y_{ai})$ and one of the M sets of coordinates ($x_{am}$, $y_{am}$) is calculated. The set of coordinates $va_i(x_{ai}, y_{ai})$ represents one of the six sets of center-coordinates $va_1(x_{a1}, y_{a1})$, $va_2(x_{a2}, y_{a2})$, $va_3(x_{a3}, y_{a3})$, $va_4(x_{a4}, y_{a4})$, $va_2(x_{a5}, y_{a5})$ and $va_6(x_{a6}, y_{a6})$, corresponding to the reference points 22P, 24P, 26P, 32P, 34P and 36P of the target 20, obtained by the execution of the provisional-target-image-confirmation subroutine of FIG. 17. For example, when the image-pixel area KR (FIG. 19), from which the M sets of center-coordinates ($x_{am}$, $y_{am}$) are derived, includes an image corresponding to the reference point 22P of the target 20, the distance ΔL is calculated as a distance between the set of center-coordinates $va_1(xa_1, ya_1)$ and one of the M sets of coordinates ($x_{am}$, $y_{am}$).

At step S5206, it is determined whether the variable MinLength is larger than the distance ΔL. Initially, since the variable MinLength has the suitable large value, which may be set as the distance corresponding to 13 image pixels arranged along the $X_a$-axis in the image-pixel area KR (MinLength>ΔL), the control proceeds to step S5208, in which the variable MinLength is made to be ΔL.

At step S5210, the following calculation is executed:

$$va_i(x_{ai}, y_{ai}) \leftarrow (x_{am}, y_{am})$$

Thereafter, the control returns to step S5204, and the routines comprising steps S5204, S5205, S5206, S5208 and S5210 are repeatedly executed until the processings of all the M sets of center coordinates ($x_{am}$, $y_{am}$) are completed.

Thus, when the processings of all the M sets of center coordinates ($x_{am}$, $y_{am}$) are completed, a most precise set of coordinates for representing a reference point (22P, 24P, 26P, 32P, 34P, 36P) of the target 20 is selected from among the M sets center coordinates ($x_{am}$, $y_{am}$), and a corresponding set of coordinates $va_i(x_{ai}, y_{ai})$, representing one of the reference points 22P, 24P, 26P, 32P, 34P and 36P, is corrected to the most precise set of coordinates.

Figure 25:
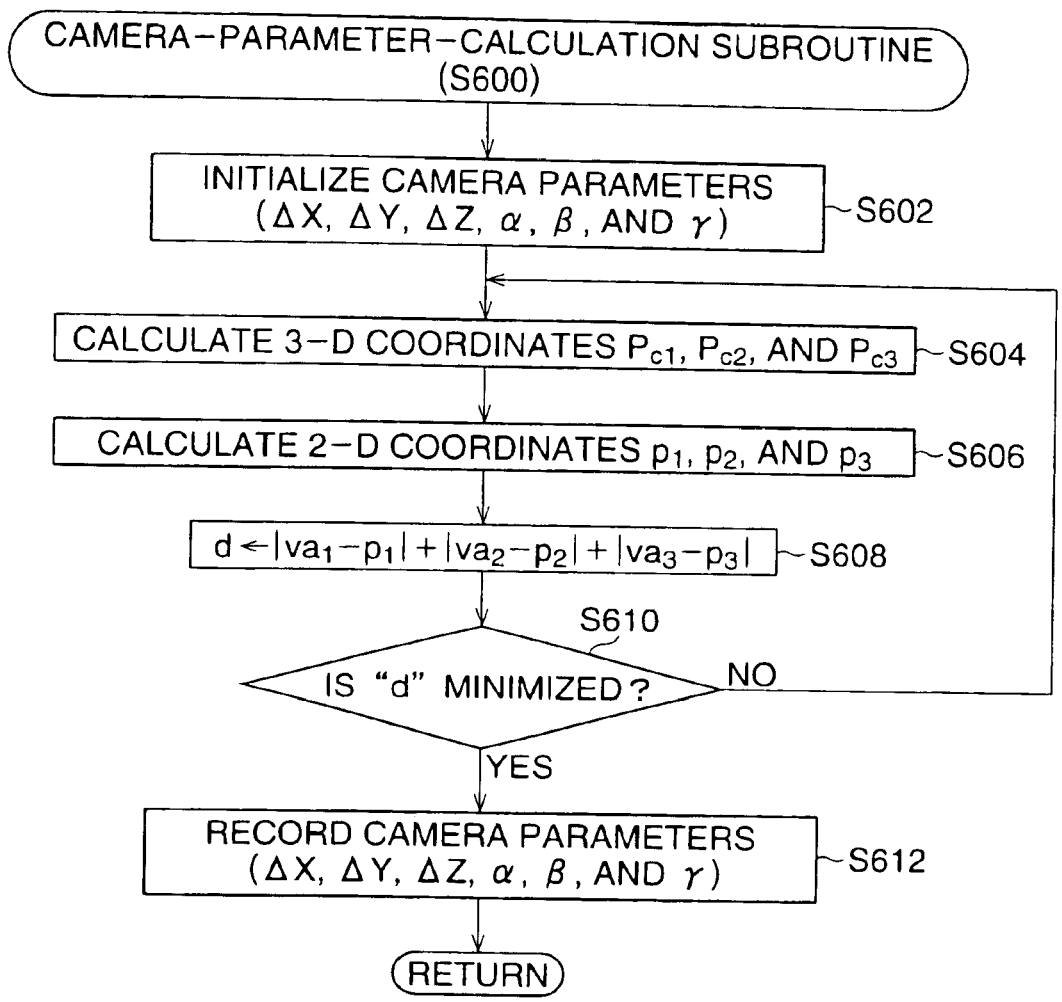
FIG. 25 is a flowchart of a camera-parameter-calculation subroutine executed in step S600 of the camera-parameter-determination routine of FIG. 8.

FIG. 25 shows a flowchart of the camera-parameter-calculation subroutine executed in step S600 of the camera-parameter-determination routine shown in FIG. 8.

At step S602, the camera parameters (ΔX, ΔY, ΔZ, α, β, γ) are initialized to "0".

At step S604, three-dimensional coordinates $P_{ci}(P_{cxi}, P_{cyi}, P_{czi})$ (i=1, 2, 3) of the main reference points 22P, 24P and 26P, based on the camera coordinate system ($X_C$-$Y_C$-$Z_C$), are calculated by providing the aforesaid formula (3) with the coordinates $P_{a1}(-LT, 0, 0)$, $P_{S2}(0, 0, 0)$ and $P_{S3}(0, 0, LT)$, and by giving respective settings of suitable values to the camera parameters ΔX, ΔY, ΔZ, α, β and γ.

At step S606, two-dimensional coordinates $p_i(x_{pi}, y_{pi})$ (i=1, 2, 3) of the main reference points 22P, 24P and 26P, based on the image-plane coordinate system ($X_p$-$Y_p$), are calculated by providing the aforesaid formulas (1) and (2) with the calculated three-dimensional coordinates $P_{ci}(P_{cxi}, P_{cyi}, P_{czi})$ (i=1, 2, 3).

At step S608, the following calculation is executed:

$$d \leftarrow |va_1-p_1|+|va_2-p_2|+|va_3-p_3|$$

Herein: of course, the respective $p_1$, $p_2$ and $p_3$ are the coordinates $(x_{p1}, y_{p1})$, $(x_{p2}, y_{p2})$ and $(x_{p3}, y_{p3})$ of the main reference points 22P, 24P and 26P calculated at step S606 and based on the image-plane coordinate system ($X_p$-$Y_p$), and the respective $va_1$, $va_2$ and $va_3$ are the center-coordinates $(x_{a1}, y_{a1})$, $(x_{a2}, y_{a2})$ and $(x_{a3}, y_{a3})$ of the main reference points 22P, 24P and 26P obtained from the picture IM1 and based on the picture coordinate system ($X_a$-$Y_a$). Note, as already stated above, the image-plane coordinate system ($X_p$-$Y_p$) and the picture coordinate system ($X_a$-$Y_a$) are essentially identical to each other.

At step S610, it is determined whether the calculated "d" is minimized. If the calculated "d" is not minimized, the control returns to step S604, and the routine comprising steps S604, S606 and S608 is further executed by giving respective settings of other values to the camera parameters ΔX, ΔY, ΔZ, α, β and γ. Namely, the execution of the routine comprising steps S604, S606, S608 and S610 is repeated until the calculated "d" is minimized.

At step S610, when the minimization of the calculated "d" is confirmed, the control proceeds from step S610 to step S612, in which the camera parameters ΔX, ΔY, ΔZ, α, β and γ as they stand now are stored and recorded in a given area of the working memory 56. Thereafter, the control returns to the camera-parameter-determination routine of FIG. 8.

Figure 26:
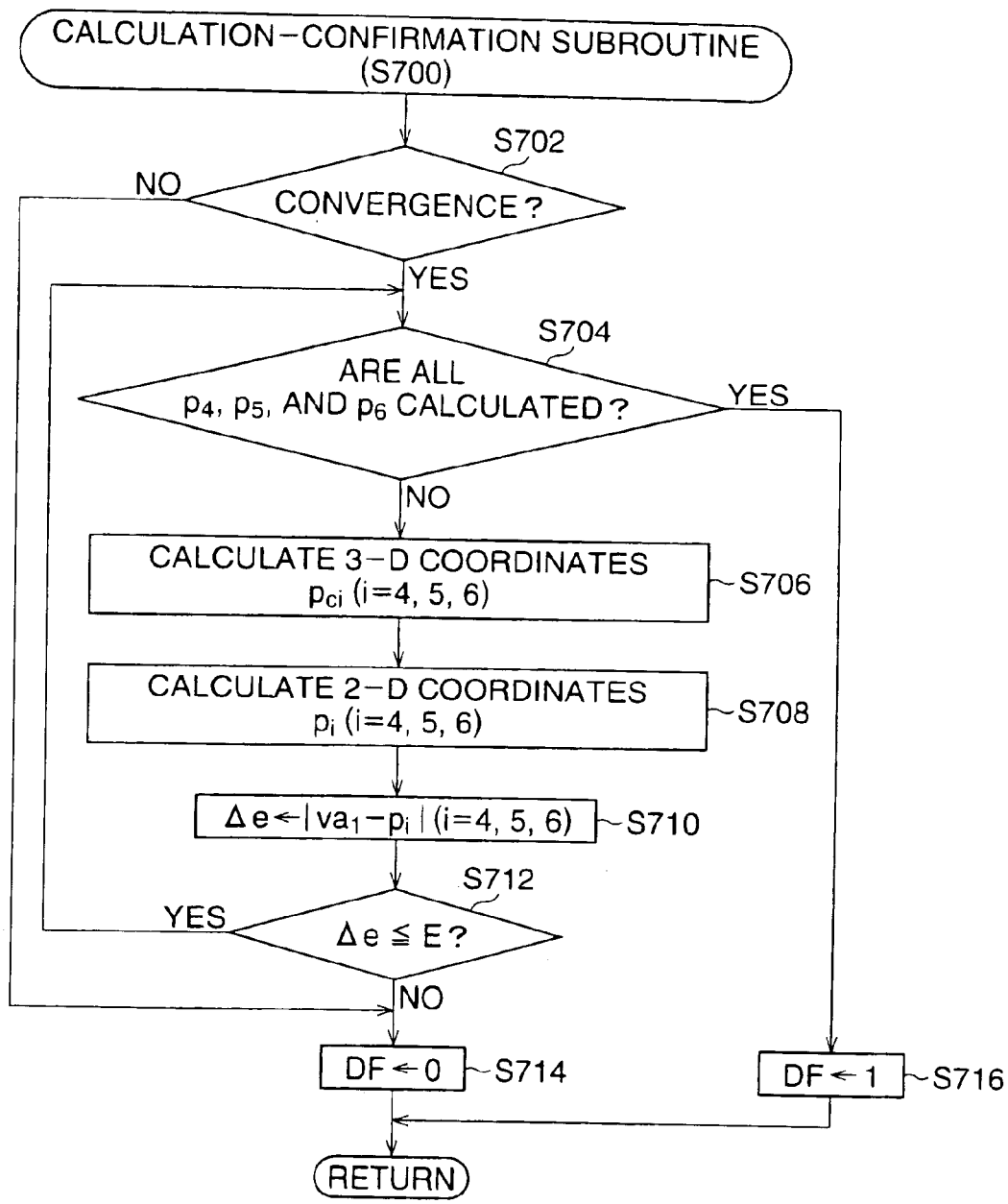
FIG. 26 is a flowchart of a calculation-confirmation subroutine executed in step S700 of the camera-parameter-determination routine of FIG. 8.

FIG. 26 shows a flowchart of the calculation-confirmation subroutine executed in step S700 of the camera-parameter-determination routine shown in FIG. 8.

At step 702, it is determined whether each of the calculated camera parameters ΔX, ΔY, ΔZ, α, β and γ is converged on a predetermined value. If a sufficient convergence of the camera parameters is not obtained, the control skips to step S714, in which a flag DF is set to "0". The flag DF indicates whether the calculation of the camera parameters ΔX, ΔY, ΔZ, α, β and γ is correct. When the calculation of the camera parameters is not correct, the flag DF is set to "0", and when the calculation of the camera parameters is correct, the flag DF is set to "1".

At step S702, when the sufficient convergence of the camera parameters is obtained, the control proceeds to step S704, in which it is determined whether all two-dimensional coordinates $p_i(x_{pi}, y_{pi})$ (i=4, 5, 6) of the assistant reference points 32P, 34P and 36P, based on the image-plane coordinate system ($X_p$-$Y_p$), have been calculated at steps S706 and S708.

When the calculations of all the two-dimensional coordinates $p_i(x_{pi}, y_{pi})$ (i=4, 5, 6) is not completed, the control proceeds to step S706, in which one of three-dimensional coordinates $P_{ci}(P_{cxi}, P_{cyi}, P_{czi})$ (i=4, 5, 6) of the assistant reference points 32P, 34P and 36P is calculated by providing the aforesaid formula (3) with a corresponding one set of the three sets of coordinates $P_{s4}(-2LT/3, 0, 0)$, $P_{S5}(-LT/3, 0, 0)$ and $P_{S6}(0, 0, LT/2)$ and the camera parameters ΔX, ΔY, ΔZ, α, β and γ obtained by the execution of the camera-parameter-calculation subroutine of FIG. 25.

At step S708, a set of two-dimensional coordinates $p_i(x_{pi}, y_{pi})$ (i=4, 5, 6), representing the corresponding assistant reference point (32P, 34P, 36P), is calculated by providing the aforesaid formulas (1) and (2) with the calculated three-dimensional coordinates $P_{ci}(P_{cxi}, P_{cyi}, P_{czi})$ (i=4, 5, 6).

At step S710, the following calculation is executed:

$$\Delta e \leftarrow |va_i - p_i| (i=4, 5, 6)$$

Herein: of course, "$p_i$" is the coordinates $(x_{pi}, y_{pi})$ of the assistant reference point (32P, 34P, 36P) calculated at step S708, and "$va_i$" is the corresponding one set of the three sets of center-coordinates $(x_{a4}, y_{a4})$, $(x_{a5}, y_{a5})$ and $(x_{a6}, y_{a6})$ respectively representing the assistant reference points 32P, 34P and 36P obtained from the picture IM1.

At step S712, it is determined whether the calculated $\Delta e$ is equal to or smaller than a predetermined permissible value "E". Note, the permissible value E may be set as corresponding to a dimension of ¼ pixel.

If $\Delta e > E$, the control proceeds to step S714, in which the flag DF is set to "0", thereby indicating that the calculation of the camera parameters $\Delta X$, $\Delta Y$, $\Delta Z$, $\alpha$, $\beta$ and $\gamma$ is incorrect.

On the other hand, if $\Delta e \leq E$, the control returns to step S704, and the routine comprising S704, S706, S708, S710 and S712 is again executed. Namely, when all the calculated coordinates $p_4(x_{p4}, y_{p4})$, $p_5(x_{p5}, y_{p5})$ and $p_6(x_{p6}, y_{p6})$ respectively coincide with the center-coordinates $(x_{a4}, y_{a4})$, $(x_{a5}, y_{a5})$ and $(x_{a6}, y_{a6})$ of the assistant reference points 32P, 34P and 36P within a permissible range defined by the value "E" (S712), i.e. when the calculation of all the coordinates $p_4(x_{p4}, y_{p4})$, $p_5(x_{p5}, y_{p5})$ and $p_6(x_{p6}, y_{p6})$ are successively completed, the control proceeds from step S704 to step S716, in which the flag DF is made to be "1", thereby indicating that the calculation of the camera parameters $\Delta X$, $\Delta Y$, $\Delta Z$, $\alpha$, $\beta$ and $\gamma$ is correct.

In the aforesaid preferred embodiment, the target 20 is provided with three assistant reference points 32P, 34P and 36P. nevertheless, in another embodiment, only one assistant reference point or more than three assistant reference points may be arranged on a target to confirm an image position of the target.

Finally, it will be understood by those skilled in the art that the foregoing description is of preferred embodiments of the system, and that various changes and modifications may be made to the present invention without departing from the spirit and scope thereof.

The present disclosure relates to subject matter contained in Japanese Patent Application No. 11-251952 (filed on Sep. 6, 1999), which is expressly incorporated herein, by reference, in its entirety.

What is claimed is:

1. An image processing computer system for a photogrammetric analytical measurement using a picture having an image of a target, the target having at least three main reference point areas and at least one assistant reference point area, each of the main and assistant reference point areas being a high luminance point area surrounded by a low luminance area, said computer system comprising:
    a target-image extractor that extracts the image of the target from the picture, by detecting high luminance point areas, each corresponding to one of the main and assistant reference point areas of the target;
    an image processor that processes the extracted image of the target to determine a two-dimensional position of each of the main and assistant reference point areas of the target with respect to a two-dimensional picture coordinate system defined on the image;
    a first calculator that calculates three-dimensional positions of the main reference point areas with respect to a three-dimensional camera coordinate system defined on a camera that photographs the picture;
    a second calculator that calculates two-dimensional positions of the main reference point areas with respect to a two-dimensional image-plane coordinate system, defined on an image plane of the camera, based on the three-dimensional positions of the main reference point areas calculated by the first calculator;
    a third calculator that calculates camera parameters based on the two-dimensional positions of the main reference point areas with respect to the two-dimensional picture coordinate system and the two-dimensional positions of the main reference point areas with respect to the two-dimensional image-plane coordinate system, the camera parameters including a position and a direction of the camera when the picture is photographed;
    a fourth calculator that calculates a three-dimensional position of the assistant reference point area with respect to the three-dimensional camera coordinate system based on the camera parameters calculated by the third calculator;
    a fifth calculator that calculates a two-dimensional position of the assistant reference point area with respect to the two-dimensional image-plane coordinate system based on the three-dimensional position of the assistant reference point area calculated by the fourth calculator; and
    a determiner that determines whether the camera parameters calculated by said third calculator are correct by comparing the two-dimensional position of the assistant reference point area obtained by the image processor with the two-dimensional position of the assistant reference point area calculated by the fifth calculator.

2. An image processing method for a photogrammetric analytical measurement using a picture having an image of a target, the target having at least three main reference point areas and at least one assistant reference point area, each of the main and assistant reference point areas being a high luminance point area surrounded by a low luminance area, comprising:
    extracting the image of the target from the picture, by detecting high luminance point areas, each corresponding to one of the main and assistant reference point areas of the target;
    processing the extracted image of the target to determine a two-dimensional position of each of the main and assistant reference point areas of the target with respect to a two-dimensional picture coordinate system defined on the image;
    calculating three-dimensional positions of the main reference point areas with respect to a three-dimensional camera coordinate system defined on a camera that photographs the picture;
    calculating two-dimensional positions of the main reference point areas with respect to a two-dimensional image-plane coordinate system, defined on an image plane of the camera, based on the three-dimensional positions of the main reference point areas;
    calculating camera parameters based on the two-dimensional positions of the main reference point areas with respect to the two-dimensional picture coordinate system and the two-dimensional positions of the main reference point areas with respect to the two-dimensional image-plane coordinate system, the camera parameters including a position and a direction of the camera when the picture is photographed;

calculating a three-dimensional position of the assistant reference point area with respect to the three-dimensional camera coordinate system based on the calculated camera parameters;

calculating a two-dimensional position of the assistant reference point area with respect to the two-dimensional image-plane coordinate system based on the calculated three-dimensional position of the assistant reference point area; and determining whether the camera parameters are correct by comparing the two-dimensional position of the assistant reference point area with respect to the two-dimensional picture coordinate system with the two-dimensional position of the assistant reference point area with respect to the two-dimensional image-plane coordinate system.

3. A memory medium storing an image processing program for a photogrammetric analytical measurement using a picture having an image of a target, the target having at least three main reference point areas and at least one assistant reference point area, each of the main and assistant reference point areas being a high luminance point area surrounded by a low luminance area, said program comprising:

extracting the image of the target from the picture, by detecting high luminance point areas, each corresponding to one of the main and assistant reference point areas of the target;

processing the extracted image of the target to determine a two-dimensional position of each of the main and assistant reference point areas of the target with respect to a two-dimensional picture coordinate system defined on the image;

calculating three-dimensional positions of the main reference point areas with respect to a three-dimensional camera coordinate system defined on a camera that photographs the picture;

calculating two-dimensional positions of the main reference point areas with respect to a two-dimensional image-plane coordinate system, defined on an image plane of the camera, based on the three-dimensional positions of the main reference point areas;

calculating camera parameters based on the two-dimensional positions of the main reference point areas with respect to the two-dimensional picture coordinate system and the two-dimensional positions of the main reference point areas with respect to the two-dimensional image-plane coordinate system, the camera parameters including a position and a direction of the camera when the picture is photographed;

calculating a three-dimensional position of the assistant reference point area with respect to the three-dimensional camera coordinate system based on the calculated camera parameters;

calculating a two-dimensional position of the assistant reference point area with respect to the two-dimensional image-plane coordinate system based on the calculated three-dimensional position of the assistant reference point area; and determining whether the camera parameters are correct by comparing the two-dimensional position of the assistant reference point area with respect to the two-dimensional picture coordinate system with the two-dimensional position of the assistant reference point area with respect to the two-dimensional image-plane coordinate system.

* * * * *